(12) United States Patent
Berend et al.

(10) Patent No.: US 11,985,233 B2
(45) Date of Patent: May 14, 2024

(54) SYSTEM AND METHOD FOR PERFORMING INFORMATION—THEORETICALLY SECURE QUANTUM GATE COMPUTATION AND QUANTUM KEY DISTRIBUTION, BASED ON RANDOM ROTATION OF QUBITS

(71) Applicant: B.G. NEGEV TECHNOLOGIES AND APPLICATIONS LTD., AT BEN-GURION UNIVERSITY, Beer Sheva (IL)

(72) Inventors: Daniel Berend, Beer Sheva (IL); Dor Bitan, Lehavim (IL); Shlomi Dolev, Omer (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 272 days.

(21) Appl. No.: 17/612,265

(22) PCT Filed: May 19, 2020

(86) PCT No.: PCT/IL2020/050546
§ 371 (c)(1),
(2) Date: Nov. 18, 2021

(87) PCT Pub. No.: WO2020/234874
PCT Pub. Date: Nov. 26, 2020

(65) Prior Publication Data
US 2022/0231844 A1    Jul. 21, 2022

Related U.S. Application Data

(60) Provisional application No. 62/849,910, filed on May 19, 2019.

(51) Int. Cl.
*H04L 9/08*    (2006.01)
*G06N 10/00*   (2022.01)
*G06N 10/40*   (2022.01)

(52) U.S. Cl.
CPC .......... *H04L 9/0852* (2013.01); *G06N 10/40* (2022.01)

(58) Field of Classification Search
CPC ..... H04L 9/0852; H04L 9/0838; G06N 10/40; G06N 10/00
See application file for complete search history.

(56) References Cited

U.S. PATENT DOCUMENTS 7,333,611 B1 *  2/2008  Yuen .................. H04B 10/70
                                            380/256
7,620,182 B2  11/2009  Berzanskis et al.
(Continued)

FOREIGN PATENT DOCUMENTS

WO    WO-2017166054 A1 * 10/2017

OTHER PUBLICATIONS

International Search Report and Written Opinion of PCT/IL2020/050546 dated Aug. 9, 2020, 9 pages.
(Continued)

*Primary Examiner* — Darren B Schwartz
(74) *Attorney, Agent, or Firm* — Dority & Manning, P.A.

(57) ABSTRACT

A computer implemented method for encoding bits by qubits to perform information-theoretically secure quantum gate computation, according to which pairs of quantum bits consisting of a first qubit as an encoding of "0" and a second qubit as an encoding of "1" are randomly selected, such that the first and second qubits are orthogonal to each other as quantum states and are interchanged by a NOT gate. Each qubit rotating to a desired initial direction and then each rotated qubit is further rotated to its antipodal direction by
(Continued)

applying a quantum NOT or CNOT gate to the each rotated qubit, without any knowledge about the desired direction. A unitary gate is further applied over the qubits, using an ancillary $|0\rangle$ qubit that creates an equally weighted superposition of the qubits.

11 Claims, 5 Drawing Sheets

(56) References Cited

U.S. PATENT DOCUMENTS

| | | | | |
|---|---|---|---|---|
| 8,897,449 | B1* | 11/2014 | Broadbent | H04L 9/0891 380/278 |
| 9,306,739 | B1* | 4/2016 | Troupe | H04L 9/0858 |
| 11,551,127 | B1* | 1/2023 | Otterbach | G06N 10/00 |
| 2002/0106084 | A1* | 8/2002 | Azuma | H04L 9/0852 380/263 |
| 2005/0036624 | A1* | 2/2005 | Kent | H04L 9/0858 380/277 |
| 2006/0059403 | A1* | 3/2006 | Watanabe | H04L 9/0858 714/758 |
| 2007/0288684 | A1 | 12/2007 | Bergou et al. | |
| 2009/0003591 | A1* | 1/2009 | Murakami | H04L 9/0852 380/255 |
| 2011/0142242 | A1* | 6/2011 | Tanaka | H04L 9/0852 380/282 |
| 2018/0048466 | A1* | 2/2018 | Chen | H04B 10/70 |
| 2019/0028271 | A1 | 1/2019 | Röhsner et al. | |
| 2021/0058244 | A1* | 2/2021 | Jacak | H04L 9/0852 |

OTHER PUBLICATIONS

Acar et al, "A Survey on Homomorphic Encryption Schemes: Theory and Implementation", ACM Computing Surveys, vol. 51, No. 4, Article 79, Jul. 2018, 35 pages.
Aharonov et al, "On Quantum Advantage in Information Theoretic Single-Server PIR" arXiv:1902.09768v1, Feb. 26, 2019, 25 pages.
Aharonov et al, "Revisiting Hardy's Paradox: Counterfactual Statements, Real Measurements, Entaglement and Weak Values", Physics Letters A, vol. 301, Aug. 26, 2002, 9 pages.
Aharonov et al, "Time Symmetry in the Quantum Process of Measurement", Physical Review, vol. 134, No. 6B, Jun. 22, 1964, 7 pages.
Alagic et al, "Quantum Fully Homomorphic Encryption with Verification", International Association for Cryptologic Research, 2017, 30 pages.
Ambainis et al, "Private Quantum Channels", 41st Annual Symposium on Foundations of Computer Science, 2000, 2000, 7 pages.
Bennett et al, "Quantum Cryptography: Public Key Distribution and Coin Tossing", Theoretical Computer Science, vol. 560, 2014, 5 pages.
Bitan et al, "One-Round Secure Multiparty Computation of Arithmetic Streams and Functions", 19 pages, Jun. 17, 2018.
Brakerski et al, "Lattice-Based Fully Dynamic Multi-Key FHE with Short Ciphertexts", Weizmann Institute of Science and Tel-Aviv University, 23 pages, Jul. 21, 2016.
Brakerski, "Quantum FHE (Almost) as Secure as Classical", Weizmann Institute of Science, 32 pages, Jul. 24, 2018.
Brassard et al, "Multi-Party Pseudo-Telepathy", arXiv:quant-ph/0306042v1, Jun. 5, 2003, 11 pages.
Brassard et al, "Quantum Pseudo-Telepathy", Foundations of Physics, vol. 35, No. 11, Nov. 2005, 31 pages.
Braunstein et al, "Supplementary Material for: Side-Channel Free Quantum Key Distribution", Physical Review Letters, 5 pages, 2012.
Broadbent et al., "Quantum Homomorphic Encryption for Circuits of Low T-gate Complexity", Department of Mathematics and Statistics, University of Ottawa and Institute for Quantum Information and Matter, California Institute of Technology, 39 pages, 2015.
Broadbent, "Delegating Private Quantum Computations", arXiv:1506.01328v1, Jun. 3, 2015, 13 pages.
Childs, "Secure Assisted Quantum Computation", arXiv:0111046v2, Jul. 6, 2015, 11 pages.
Deng et al, "Secure Direct Communication with a Quantum One-Time Pad", Physical Review A, vol. 69, 2004, 4 pages.
Deutsch et al, "Rapid Solution of Problems by Quantum Computation", Proceedings of the Royal Society A: Mathematical, Physical and Engineering Sciences, 1992, 6 pages.
Dulek et al, "Quantum Homomorphic Encryption for Polynominal-Size Circuits", Theory of Computing, vol. 14, No. 7, 45 pages, May 17, 2018.
Einstein et al, "Can Quantum-Mechanical Description of Physical Reality Be Considered Complete", Physical Review, vol. 47, May 15, 1935, 4 pages.
Elitzur et al, "The Retrocasual Nature of Quantum Measurement Revealed by Partial and Weak Measurements", AIP Conference Proceedings, Nov. 29, 2011, 13 pages.
Elitzur, "Nonlocal Effects of Partial Measurements and Quantum Erasure", Physical Review A, vol. 63, 14 pages, 2001.
Gentry, "A Fully Homomorphic Encryption Scheme", A Dissertation Submitted to the Department of Computer Science and the Committee on Graduate Studies of Stanford University, 2009, 209 pages.
Gillett et al, "Experimental Feedback Control of Quantum Systems Using Weak Measurements", Physical Review Letters, vol. 104, Feb. 26, 2010, 5 pages.
Grover, "A Fast Quantum Mechanical Algorithm for Database Search", 8 pages, 1996.
Jordan, "Quantum Algorithm Zoo", http://math.nist.gov/quantum/zoo, 2018, 75 pages.
Katz et al, Introduction to Modern Cryptography, Second Edition, 598 pages, 2014.
Li et al, "Monitoring the Intercept-Resend Attack with the Weak Measurement Model", Quantum Information Processing, 2018, 12 pages.
Liang, "Symmetric quantum fully homomorphic encryption with perfect security", Quantum Information Process, 2013, 13 pages.
Mermin, "Simple Unified Form for the Major No-Hidden-Variables Theorems", Physical Review Letters, vol. 65, No. 27, Dec. 31, 1990, 4 pages.
Nielsen et al, "Quantum Computation and Quantum Information", 710 pages, Oct. 2000.
Ouyang et al, "Quantum Homomorphic Encryption from Quantum Codes", Physical Review A, vol. 98, 7 pages, 2018.
Ronald Cramer et al, "Secure Multiparty Computation and Secret Sharing—An Information Theoretic Approach" Dec. 31, 2012, 167 pages.
Shor, "Algorithms for Quantum Computation: Discrete Logarithms and Factoring", 11 pages, 1994.
Tan et al, "A Quantum Approach to Homomorphic Encryption", Scientific Reports, 2016, 8 pages.
Yu et al, "Limitations on information-theoretically-secure quantum homomorphic encryption", Physical Review A, vol. 90, 2014, 5 pages.

* cited by examiner

SYSTEM AND METHOD FOR PERFORMING INFORMATION—THEORETICALLY SECURE QUANTUM GATE COMPUTATION AND QUANTUM KEY DISTRIBUTION, BASED ON RANDOM ROTATION OF QUBITS

CROSS REFERENCE TO RELATED APPLICATIONS

This application is the U.S. National Stage entry of International Application Number PCT/IL2020/050546 filed under the Patent Cooperation Treaty having a filing date of May 19, 2020, which claims priority to U.S. Provisional Patent Application No. 62/849,910, having a filing date of May 19, 2019, which are incorporated herein by reference.

FIELD OF THE INVENTION

The present invention relates to the field of secure quantum computation. More particularly, the present invention relates to a system and method for performing information-theoretically secure quantum gate computation and quantum key distribution, based on random rotation of qubits.

BACKGROUND OF THE INVENTION

Quantum computations are typically based on representing the classical bits 0 and 1 as the pure state qubits of the computational basis |0> and |1>, utilizing quantum phenomena of superposition and entanglement.

A qubit is a quantum bit, the counterpart in quantum computing to the binary digit or bit of classical computing. Just as a bit is the basic unit of information in a classical computer, a qubit is the basic unit of information in a quantum computer.

In a quantum computer, a number of elemental particles such as electrons or photons can be used, with either their charge or polarization acting as a representation of "0" and/or "1". Each of these particles is known as a qubit. The nature and behavior of these particles (as expressed in quantum theory) form the basis of quantum computing. The two most relevant aspects of quantum physics are the principles of superposition and entanglement.

According to quantum law each qubit utilized could take a superposition of both 0 and 1. Thus, the number of computations that a quantum computer could undertake is $2^n$, where n is the number of qubits used. A quantum computer consisting of 500 qubits would have a potential to do $2^{500}$ calculations in a single step. Qubits interact with each other via quantum entanglement.

Particles that have interacted at some point retain a type of connection and can be entangled with each other in pairs, in a process known as correlation. Knowing the spin state of one entangled particle—up or down—allows knowing that the spin of its mate is in the opposite direction.

Due to the phenomenon of superposition, the measured particle has no single spin direction before being measured, but is simultaneously in both a spin-up and spin-down state. The spin state of the particle being measured is decided at the time of measurement and communicated to the correlated particle, which simultaneously assumes the opposite spin direction to that of the measured particle. Quantum entanglement allows qubits that are separated by incredible distances to interact with each other instantaneously (not limited to the speed of light). No matter how great the distance between the correlated particles, they will remain entangled as long as they are isolated. Therefore, quantum superposition and entanglement create an enormously enhanced computing power. Where a 2-bit register in an ordinary computer can store only one of four binary configurations (00, 01, 10, or 11) at any given time, a 2-qubit register in a quantum computer can store all four numbers simultaneously, because each qubit represents two values. If more qubits are added, the increased capacity is expanded exponentially.

Practically, each qubit $\psi$ is a unit vector in $\mathbb{R}^3$, that may be represented by two real numbers $\theta$ and $\varphi$: using sphere representation:

$$\psi = \cos(\theta/2)0 + e^{i\varphi} \sin(\theta/2)1,$$

where $\theta, \varphi \in \mathbb{R}$ $$\psi = \cos(\theta/2)0 + e^{i\psi} \sin(\theta/2)1,$$

where $\theta, \varphi \in \mathbb{R}$, as shown in FIG. 1.

The basic building block of quantum computation protocols is the qubit. The qubit is the quantum version of the classical bit used in classical computing. Whereas a classical bit may be described as an element of $\{0,1\}$, a qubit may be described as a unit vector in the Hilbert space $\mathbb{C}^2$. Denote $\mathbb{H} = \mathbb{C}^2$, and 0 and 1 be the elements $$\begin{pmatrix} 1 \\ 0 \end{pmatrix}$$

and $$\begin{pmatrix} 0 \\ 1 \end{pmatrix}$$

of $\mathbb{H}$, respectively. $\{0,1\}$ is the computational basis of $\mathbb{H}$. The notation denote qubits by $\psi$. A system composed of n qubits is described by a unit vector of $\mathbb{H}^{\otimes n}$, the n-fold tensor product of $\mathbb{H}$ with itself. Such a system of n qubits is the quantum version of an n-long string of classical bits.

An arbitrary qubit $\psi \in \mathbb{H}$ H may be described by its coordinates in the computational basis using four real numbers: $\psi = \alpha 0 + \beta 1$, where $\alpha, \beta \in \mathbb{C}$. If $\psi_1$ and $\psi_2$ are two elements of $\mathbb{H}$ such that $\psi_1 = e^{i\gamma}\psi_2$ for some $\gamma \in \mathbb{R}$, then $\psi_1$ and $\psi_2$ are equal up to a global phase factor. Global phase factors have no influence on quantum computations, and hence may be ignored. Hence, and as $\psi$ is a unit vector, that may be written $\psi$ using only two real numbers:

$$\psi = \cos(\theta/2)0 + e^{i\varphi} \sin(\theta/2)1,$$

where $\theta, \varphi \in \mathbb{R}$. This is the Bloch sphere representation of $\psi$. The name sphere representation comes from the fact that $\theta$ and $\varphi$ may be used to visualize $\psi$ as a unit vector in $\mathbb{R}^3$.

In classical computing, strings of classical bits are manipulated using logic gates, information is represented as a string of bits, and the function to be computed over the information is represented as a logic circuit, which is composed of logic gates. In quantum computing, systems of qubits are manipulated using quantum gates, information is represented as a system of qubits and the function to be computed over the information is represented as a quantum circuit, which is composed of quantum gates. In order to implement a classical computation, bits are physically realized and the physical realizations of the bits are manipulated using physical realizations of logic gates. To implement quantum computations, qubits are physically realized, and these physical realizations of the qubits are manipulated using physical realizations of quantum gates. While classical logic gates are Boolean functions, quantum gates are unitary operators on Hilbert spaces. The Kronecker product notation is used to represent unitary operations as matrices.

Quantum computers may be used to perform computations that have been performed using classical computers, as well as other tasks. For example, any information that may be represented classically as a string of bits may be represented in the quantum model as a tensor product of elements of the computational basis $\{0,1\}$ of $\mathbb{H}$. Then, any classical circuit may be implemented in the quantum model using a quantum circuit composed of Toffoli gates, which is the quantum version of the classical universal NAND gate.

Reading Quantum Information

A physical realization of a qubit may come in different forms. However, according to the postulates of quantum mechanics, no matter what form of realization is chosen, given a physical realization of an arbitrary qubit, $\psi$, one cannot determine its coordinates. This phenomenon is known as the uncertainty principle. The inability to determine the coordinates of an arbitrary qubit is not an issue of insufficient measuring devices, but a consequence of the fundamental laws of quantum mechanics. According to these laws, an arbitrary qubit may be realized (up to a certain amount of precision, dependent of the accuracy of the equipment used), but it cannot be read. Qubits may be measured. Measurements of qubits are performed in reference to a chosen orthonormal basis of $\mathbb{H}$ and the outcome of the measurement is random, either zero or one, as detailed below. As a result of the measurement, the qubit is transformed into one of the two qubits of that orthonormal basis. The probability of obtaining each of the possible outcomes is the square of the absolute value of the corresponding coordinate of the qubit in the chosen basis. Explicitly, given $\theta, \varphi \in \mathbb{H}$ denoting $$\psi_0 = \begin{pmatrix} \cos(\theta/2) \\ e^{i\varphi}\sin(\theta/2) \end{pmatrix}, \psi_1 = \begin{pmatrix} \sin(\theta/2) \\ -e^{i\phi}\cos(\theta/2) \end{pmatrix}, \quad (4)$$

and denoting by $B_{(\theta,\varphi)}$ the orthonormal basis $\{\psi_0,\psi_1\}$ of $\mathbb{H}$. For a qubit $\psi \in \mathbb{H}$ and an orthonormal basis $B_{(\theta,\varphi)}$ of $\mathbb{H}$, write $\psi = \alpha\psi_0 + \beta\psi_1$. When $\psi$ is measured in reference to $B_{(\theta,\varphi)}$, there is a probability of $|\alpha|^2$ that $\psi$ will transform into $\psi_0$, yielding the outcome 0, and a probability of $|\beta|^2$ that it will transform into $\psi_1$, yielding the outcome 1. When $\psi$ is measured in reference to the basis $B_{(\theta,\varphi)}$, it collapses into one of the elements of that basis. Given $B_{(\theta,\varphi)}$, an orthonormal basis of $\mathbb{H}$, any unit vector $\psi = \alpha\psi_0 + \beta\psi_1$ is a superposition of $\psi_0$ and $\psi_1$, and the elements of $B_{(\theta,\varphi)}$ are pure states in reference to $B_{(\theta,\varphi)}$. Since $B_{(\theta,\varphi)}$ is an orthonormal basis, $\alpha$ and $\beta$ are the inner products of $\psi$ and the elements of $B_{(\theta,\varphi)}$. In general, if $B = \{v_1, \ldots, v_n\}_1$ is an orthonormal basis of an n-dimensional Hilbert space and $v = \Sigma_{j=1}^n \alpha_j v_j$, the inner product of $v_k$ v, denoted by $v_k|v$, is $$v_k|v = \langle v_k|\Sigma_{j=1}^n \alpha_j v_j \rangle = \Sigma_{j=1}^n \alpha_j v_k|v_j = \alpha_k. \quad (5)$$

Hence, $|\alpha|^2 = |\psi_0|\psi|^2$ and $|\beta|^2 = |\psi_1|\psi|^2$. This fact is used to compute the probabilities of obtaining the different outcomes when measuring a given qubit (or a system of qubits) in reference to a given orthonormal basis. Measurements of systems of l qubits are performed in reference to orthonormal bases of $\mathbb{H}^{\otimes l}$, and result in a collapse of the system into one of the elements of that basis. The possible outcomes of such a measurement are the corresponding binary strings of length l, and the probability of obtaining each of the possible outcomes is the square of the absolute value of the corresponding coordinate of the system in the chosen basis. These may be computed using (5).

If l=2, and let $B_{(\theta,\varphi)} = \{\psi_0,\psi_1\}$ and $B_{(\theta',\varphi')} = \{\psi'_0,\psi'_1\}$ two orthonormal bases of $\mathbb{H}$. Tensor products of elements of these bases give the following orthonormal basis $\{\psi_0\psi'_0, \psi_0\psi'_1, \psi_1\psi'_0, \psi_1\psi'_1\}$, denoted $B_{(\theta,\varphi)} \otimes B_{(\theta',\varphi')}$ of $\mathbb{H}^{\otimes 2}$. Given a system of two qubits, measuring that system in reference to $B_{(\theta,\varphi)} \otimes B_{(\theta',\varphi')}$ is equivalent to measuring the first qubit in reference to $B_{(\theta,\varphi)}$ and the second qubit in reference to $B_{(\theta',\varphi')}$.

Delegation of computation, while preserving the confidentiality of the data (and sometimes even the program), is a challenging practical task that has kept researches busy ever since it was brought up in 1978 by Rivest, Adelman, and Dertouzos ["On data banks and privacy homomorphisms", 1978]. That problem addresses scenarios similar to the following. A user is holding information in the form of a string x. The user wishes to use the services of a remote server, which will be referred to as the cloud, to store x and perform computations over the stored data using computing engines provided by the cloud. Assume that x is confidential, and hence, the user does not want to share x with the cloud infrastructure enterprises. For example, the user may be a financial company and x some information regarding the financial activity of the company. The company wishes to use the services of a distrustful cloud to store the data and perform computations over the data.

In particular, there can be much use in information-theoretically secure (IT-secure) schemes that would enable such a delegation of data and computations. The security of computationally secure schemes is based on (a) unproven assumptions regarding the computational hardness of specific mathematical problems, and (b) the assumption that the computing power of the adversary is insufficient for solving instances of these assumed-to-be-hard mathematical problems. The security of IT-secure schemes is free of such assumptions and is derived from information theory.

Existing solutions to the problem of delegation of computation are based on either the distributed approach of secure multi-party computation (MPC, see [CDN15]) or the single-server approach of homomorphic encryption (HE, see [AAUC18]). MPC-oriented solutions often achieve IT-security, but to support processing of any function over the encrypted data, they require ongoing communication between the servers among whom the ciphertext is distributed. HE-oriented solutions typically require no communication, but to maintain IT-security, they can support processing of only a limited set of functions over the encrypted data. Fully homomorphic encryption (FHE) schemes, which may support processing of any function over the encrypted data, can only achieve computational security.

HE schemes may be described by a collection of four algorithms. The key space, the message space and the ciphertext space of a given scheme are denote by $\mathcal{K}, \mathcal{M}$, and $\mathcal{C}$, respectively.

The algorithms are as follows.

Gen—A key generation algorithm which, given a security parameter input, n, outputs a key, $k \in \mathcal{K}$.

Enc—An encryption algorithm which, given a plaintext input, $x \otimes \mathcal{M}$, and a key, k, outputs a ciphertext $c \in \mathcal{C}$. $c=Enc_k(x)$ to emphasize that the encryption depends on k.

Eval—An evaluation algorithm which, given a ciphertext input, $c=Enc_k(x)$, and a function, $f$, outputs F(c), where F(c) is an encryption of $f(x)$ using the same key. Namely, $F(c)=Enc_k(f(x))$.

Dec—A decryption algorithm which, given a ciphertext input, $c=Enc_k(x)$, and a key, k, outputs x.

An example of such an HE scheme is shown in FIG. 2

HE schemes may be classified according to their level of security, complexity, and other attributes. Informally, a scheme is secure if the ciphertext leaks a negligible amount of information regarding the plaintext. Security is typically formalized in the IT or computational setting using standard privacy definitions. The collection of functions $f$, for which Eval is defined, may be different for different schemes. If Eval is defined for all Boolean functions, then the scheme is fully homomorphic. The first FHE scheme was presented in [Gen09], followed by several revisions and further solutions [VDGHV10], [GHS12], [BP16], [GHS16], [XWZ+18]. If Dec is efficient (i.e., poly-time), the scheme is compact. If Dec requires $\mathcal{O}(1)$ time and space, the scheme is fully compact. In some schemes (e.g., most quantum one-time pad based schemes, see below), the evaluation algorithm may output an encryption of the evaluated plaintext that uses a different key. Namely, on input $c=|Enc|_k(x)$, Eavl outputs $F(c)=Enc_{k'}(f(x))$, an encryption of $f(x)$ using a different key, k'. Typically, In such schemes, k' is dependent on $f$, and decryption of the evaluated ciphertext requires the user to modify her keys according to $f$. Such schemes cannot achieve full compactness.

The collection of functions $f$, for which Eval is defined, may be different for different schemes. If Eval is defined for all Boolean functions, then the scheme is fully homomorphic. The first fully homomorphic encryption scheme was presented in [Gen09], followed by several revisions and further solutions suggested since. All known fully homomorphic encryption schemes are computationally secure. The security of such a scheme is based on (a) unproven assumptions regarding the computational hardness of certain mathematical problems; (b) the assumption that the computing power of the adversary is insufficient for solving instances of these assumed-to-be-hard mathematical problems; (c) the secrecy of a key. A different approach to the problem of outsourcing storage and computation of information to a distrustful party is the distributed approach of secure multi-party computation schemes, which yields communication overhead (see [BD18]).

Quantum computers threaten the security of computationally secure schemes, allowing, if built in scale, feasible solutions to problems which are currently considered impractical to solve. For example, Deutsch and Jozsa showed in 1992 that quantum computers are able to solve certain problems exponentially faster than classical computers [DJ92]. Shor suggested in 1994 algorithms which may be invoked by quantum computers to efficiently compute discrete logarithms and factor large integers [Sho94]. These two problems are considered computationally hard, and stand in the basis of many commonly used cryptographic systems. In 1996, Grover developed a quantum search algorithm that finds a desired record in an N records database in O(N) steps [Gro96]. These are but three well-known algorithms out of numerous results established in the growing field of quantum computation [Jor18]. In light of these results, it is natural to ask whether an efficient information-theoretically secure solution to the problem of homomorphic encryption may be found in the scope of quantum computing.

In 2014, it was shown in [YPDF14] that it is impossible to construct an efficient information-theoretically secure quantum homomorphic encryption scheme. Specifically, it was proved that, the size of the encryption of an information-theoretically secure quantum homomorphic encryption scheme must grow exponentially in the input size. Hence, practical perfectly secure encryption systems can only be used to evaluate a subset of all possible functions, e.g., [Lia13], [TKO+16], [OTF18].

Several works used computationally-secure classical fully homomorphic encryption schemes to construct computationally-secure quantum homomorphic encryption schemes, e.g., [DSS16].

Broadbent suggested a client-server scheme based on combining the QOTP encryption scheme with a computationally secure classical FHE scheme. Their scheme enables the delegation of quantum information to a quantum server and homomorphic processing of a universal set of quantum gates over the encrypted data. However, their scheme falls short of achieving the properties listed above. First, their scheme employs a computationally-secure FHE protocol, which makes their scheme only computationally secure (while IT-secure schemes are required). Second, their scheme requires quantum and classical interaction between the user and the server for the processing of non-Clifford gates (while the scope of this work is constructing non-interactive schemes). Third, their scheme is not fully compact, as it requires the user to update the keys used to encrypt the data throughout the computation. Namely, to homomorphically evaluate a quantum circuit over encrypted data, the client should re-adjust her knowledge of the encryption keys on each relevant quantum wire after each gate processing. That re-adjustment requires O(s) time, where s is the size of the circuit.

An approach similar to [Bro15] was adopted by [BJ15]. There, two schemes were proposed. The first has a decryption procedure whose time-complexity scales with the square of the number of T-gates (and hence falls short of achieving full compactness). The second scheme uses a quantum evaluation key of length given by a polynomial of degree exponential in the circuit's T-gate depth, yielding a homomorphic scheme only for quantum circuits with constant T-depth. The evaluation key includes auxiliary qubits that encode the required corrections that should be performed over the processed data. Since a large number of possible corrections must be available, the length of the evaluation key is exponential in the circuit's T-gate depth, yielding a homomorphic scheme that is efficient only for quantum circuits with constant T-depth. Both the schemes of [Bro15] and [BJ15] are only computationally secure.

Dulek et al. [DSS16] used a classical FHE scheme to construct quantum gadgets that allow perfect correction of the errors that occur during the homomorphic evaluation of T-gates on encrypted quantum data. These gadgets give rise to an efficient non-interactive QFHE scheme. Their scheme is compact, but not fully compact, since decryption requires the user to apply classical changes to the keys according to f. Furthermore, it is only computationally secure.

Mahadev presented in [Mah18] a non-interactive FHE scheme for quantum circuits that is based on QOTP and uses classical keys. The scheme allows a classical user to delegate quantum computations to a quantum server, while the server is unable to learn any information about the computation. Their scheme falls short of achieving the requirement of perfect correctness as it has positive error probability.

Brakerski [Bra18] used the high-level outline of [Mah18] to construct a computationally secure QFHE scheme that enables homomorphic evaluation of classical circuits with bounded depth over classical data and with improved correctness. To support unbounded depth, [Mah18] further rely on a circular security assumption.

The schemes listed above suggest practical solutions to the problem of homomorphic encryption. However, all these schemes have computational security (and not IT-security) and fail to fulfill the requirements. The security of their schemes is based on unproven computational hardness assumptions.

As mentioned above, it was shown in [AMTdW00] that QOTP is an IT-secure encryption scheme that supports homomorphic evaluation of Pauli gates. Encryption is performed by randomly applying X and Z gates to qubits, conditioned on a two-bit (classical) key, and decryption is performed by applying the same gates in the opposite direction. However, this method alone provides no means for constructing a QHE scheme that withstands our requirements. In particular, homomorphic evaluation of Clifford gates over QOTP-encrypted data requires that the user performs computations over the classical keys in compliance to the computations that are performed by the server over the encrypted qubits. This requirement results in decryption complexity linear in the size of the circuit, and hence, the scheme is not fully-compact.

Childs [Chi05] discussed ways in which a powerful quantum server may assist a user in performing operations while preserving the confidentiality of the data. In their work, the user is assumed to have capabilities significantly inferior to those of the server. In particular, the user is only allowed to generate qubits in the 0 state, store qubits, perform swap and Pauli gates, and perform no measurements. Under these considerations, they suggest a (QOTP based) way in which the server may perform measurements on encrypted data. They also suggest algorithms which enable the server to help the user in performing a universal set of quantum gates over encrypted data, but these algorithms are neither compact nor non-interactive—they require the user to perform at least as many operations as the server for each gate, and some of them require rounds of client-server interaction.

Rhode et al. presented in [RFG12] a protocol that enables a quantum user to manipulate client data in two models of restricted quantum computation—the boson sampling and quantum walk models. Their protocol is non-interactive, fully compact, and assumes no computational hardness assumptions and no limitations on the computing power of the adversary. However, in their scheme, the same key is used for encoding each of the input qubits, and hence, their scheme withstands no standard cryptographic criterion of security. Tan et al. [TKO+16] improved on [RFG12] and presented a protocol that supports a class of quantum computations, including and beyond boson sampling, with improved security (under similar assumptions). However, they achieve no standard criterion of IT-security, as they only bound the amount of information accessible to an adversary.

Ouyang, Tan, and Fitzsimons [OTF18] took a different approach and further improved on the results of [TKO+16]. Built on constructions taken from quantum codes, they achieved an encryption scheme that supports the evaluation of circuits with a constant number of non-Clifford gates. Though achieving stronger security guarantees than [RFG12, TKO+16], their scheme withstands no standard cryptographic criterion of security. Furthermore, their scheme is neither perfectly correct nor fully compact. It suggests a tradeoff between the size of the encoding and the success probability, where achieving constant success probability costs in increasing the size of the encoding exponentially with the total number of T gates.

[Lia13] constructed a QOTP-based quantum encryption scheme which, given the encryption key, permits any unitary transformation to be evaluated on an arbitrary encrypted n-qubit state. Their scheme is efficient, compact, and IT-secure against an eavesdropper who may intercept an encrypted message (before or after evaluation). However, their scheme suggests no solution to the main problem discussed in this paper, as their evaluation algorithm is dependent on the key. Under this restriction, the server must hold the key to compute on the encrypted data. Given the key, the server may decrypt and read the message, which by no means provides the user with any level of privacy. They also constructed a scheme in which the evaluation algorithm is independent of the key, but it only supports trivial operations that are independent of the key.

Weak Measurements (WM) and QKD

Weak measurements were discussed in several places, but never as a tool to attack QKD schemes. In [GDL+10], an improved feedback-control of quantum systems was experimentally shown to be possible using weak measurements. Troupe and Farinholt [TF17] used weak measurements to construct a QKD scheme with an improved key-rate, immunity to detector basis-dependent attacks (such as detector blinding), and other various side-channel attacks. However, they have not considered WM-based attacks against their scheme, and only suggested ways in which WM could be used by Alice and Bob (the parties that wish to share the key). In [HK08], weak measurements were used to detect a spin-dependent displacement of photons passing through an air-glass interface, the photonic version of the spin Hall effect in electronic systems.

Weak Measurement (WM) based attack against conventional QKD schemes enables an adversary to gain information regarding the secret key, while reducing the risk of getting caught. Assuming that Alice and Bob use the conventional QKD schemes (such as BB84 that will be described later on) a WM attack obligates Alice and Bob to invoke expensive data-reconciliation and privacy-amplification processes, which reduce the bandwidth and compromise the security.

Though WM-based attacks on QKD schemes were not suggested elsewhere before, Kak's QKD protocol, presented in [Kak, S.: A three-stage quantum cryptography protocol. Foundations of Physics Letters 19, 293-296 (2006)], is resilient against such WM-based attacks. However, Kak's protocol requires three stages of communication which increases communication overhead. Also, in Kak's protocol each of the parties must have the capability of applying arbitrary quantum gates to quantum states.

Quantum entanglement is known to be an essential resource in many quantum settings. The utilization of entanglement in communication, computation, and other scenarios is a very active area of research. In practice, entanglement is usually created by direct interactions between subatomic particles. The creation of entangled systems requires efforts and expenditures.

It is therefore an object of the present invention to provide a system and method for of performing information-theoretically secure quantum gate computation, for securing QKD scheme resilient against WM-based attacks.

It is another object of the present invention to provide a system and method for of performing information-theoretically secure quantum gate computation, for providing QKD schemes that are perfectly secure.

It is a further object of the present invention to provide a system and method for of performing information-theoretically secure quantum gate computation, while securing entanglement once it was created, such that only its rightful owners will be able to use it.

It is still another object of the present invention to provide a system and method for performing information-theoretically secure quantum gate computation, which requires only two stages of communication.

It is yet another object of the present invention to provide a system and method for performing information-theoretically secure quantum gate computation, where only one party must have the capability of applying arbitrary quantum gates to quantum states, while the other party should be able to apply only NOT gates to qubits.

Other objects and advantages of the invention will become apparent as the description proceeds.

SUMMARY OF THE INVENTION

A computer implemented method for encoding bits by qubits to perform information-theoretically secure quantum gate computation, comprising the steps of:
  a) randomly selecting pairs of quantum bits consisting of a first qubit as an encoding of "0" and a second qubit as an encoding of "1", such that the first and second qubits are orthogonal to each other as quantum states and are interchanged by a NOT gate;
  b) rotating each qubit to a desired initial direction;
  c) further rotating each rotated qubit to its antipodal direction by applying a quantum NOT or CNOT gate to the each rotated qubit, without any knowledge about the desired direction; and
  d) further applying a unitary gate over the qubits, using an ancillary $|0\rangle$ qubit, that creates an equally weighted superposition of the qubits.

A computer implemented method for distributing a quantum key for performing information-theoretically secure quantum gate computation, comprising the steps of:
  a) generating a quantum key $k=(\theta,\varphi)$ by uniformly selecting a random pair $(\theta,\varphi)$ from $$[0, 2\pi] \times \left\{\frac{\pi}{2}, -\frac{\pi}{2}\right\};$$

b) setting an element $$\psi_0 = \cos\left(\frac{\theta}{2}\right) + e^{i\varphi}\sin(\theta/2),$$

as an encryption of "0" using the quantum key $k=(\theta,\varphi)$ as the encryption key;
  c) setting an element $\psi_1=\sin(\theta/2)-e^{i\varphi}\cos(\theta/2)$ to be the encryption of "1" using the key, such that $\psi_0$ and $\psi_1$ are orthogonal.
  d) constituting a random orthonormal basis $B_{(\theta,\varphi)}$; and
  e) allowing $\psi_0$ to be equal to $\text{NOT}\psi_1$ and vice versa by selecting $\varphi=\pm\pi/2$, such that the random orthonormal basis is $$B_{(\theta,\pm\frac{\pi}{2})} = \{\cos(\theta/2) \pm i\sin(\theta/2), \sin(\theta/2) \mp i\cos(\theta/2)\}.$$

Elements $\psi_0$ and $\psi_1$ are used for bit-wise encryption of a string x of classical bits.

Encryption operation on an input message $b \in \mathcal{M}$ may be done using the key $k=(\theta,\varphi)$, by:
  a) generating the qubit $|b\rangle$;
  b) applying K to $|b\rangle$ to obtain $|q\rangle = K|b\rangle$, where $$K = \begin{pmatrix} \cos(\theta/2) & \sin(\theta/2) \\ e^{i\varphi}\sin(\theta/2) & -e^{i\phi}\cos(\theta/2) \end{pmatrix} \in M_2(\mathbb{C});$$

and
  c) outputting an encrypted message $|q\rangle$.

Decryption operation on input ciphertext $|\psi\rangle$ may be done using the key $k=(\theta, \varphi)$, by:
  a) applying $K^\dagger$ being the conjugate transpose of $$K = \begin{pmatrix} \cos(\theta/2) & \sin(\theta/2) \\ e^{i\varphi}\sin(\theta/2) & -e^{i\varphi}\cos(\theta/2) \end{pmatrix} \in M_2(\mathbb{C})$$

to $|\psi\rangle$ to obtain $K^\dagger|\psi\rangle$
  b) measuring $K^\dagger|\psi\rangle$ with reference to the computational basis $$B_{(\theta,\pm\frac{\pi}{2})} = \{\cos(\theta/2) \pm i\sin(\theta/2), \sin(\theta/2) \mp i\cos(\theta/2)\};$$

and
  c) outputting the measurement result.

In one aspect, IT-secure quantum gate computations over the encrypted data may be further performed.

The quantum gate may be selected from the group of: NOT gates;
  a quantum gate, using an ancillary $|0\rangle$ qubit, that takes the elements of the orthonormal basis to equally weighted superpositions of the elements;
  controlled-NOT (CNOT) and CnNOT gates, where the control qubits are set as plaintext qubits.

In one aspect, entanglement of pairs of qubits may be secured by the steps of:
  a) a first party uses our random basis encryption for generating independent encryptions of two 0 bits and two 1 bits using a four-qubit system by $\psi_0\psi_0\psi_1\psi_1$;
  b) independently encrypting each of the qubits;
  c) The first party generates a pair of ancillary 0 qubits and applies the random basis entanglement gate to his system of six qubits;

d) the first party keeps the next two qubits to himself and transmits the last two to the second party;

e) the first and second parties communicate through a secure communication channel and the first party shares with the second party the keys the first party used to generate the encrypted qubits; and f) both parties decrypt the qubits they hold and obtain a system of four entangled qubits.

Two-stage information-theoretically secure and WM attacks resilient Quantum Key Distribution (QKD) may be performed between two parties, by the steps of:

a) a first party randomly selects bits $b'=b_1, \ldots b_{n+m}'$ from $\{0,1\}^{n+m}$;

b) for $1 \leq i \leq n+m$, the first party generates an independent encryption $\psi_{b'_i}$ of $b'_i$, using the random basis;

c) the first party transmits the independent encryption $\psi_{b'_i}$ to a second party;

d) the second party randomly selects m of the n+m qubits received from the first party and communicates with the first party over a public channel, while announces the positions of the selected m qubits;

e) the second party reveals the keys used for encrypting the m qubits;

f) the first party decrypts the m qubits using the keys obtained at the preceding step, while announcing the outcomes to the second party;

g) the second party checks the correctness of the outcomes to detect possible adversarial eavesdropping attempts by measuring the error rate;

h) if the error rate is below a predetermined value, i) the first party uses the unmeasured n qubits, and for $1 \leq i \leq n$, if $b_i=1$ a first party applies a NOT gate to the i'th qubit, otherwise the i'th qubit remains unchanged;

j) the first party sends the unmeasured n qubits back to the second party;

k) the second party decrypts the unmeasured n qubits to obtain a string b";

l) the second party computes $b'' \otimes \tilde{b}$ to obtain the qubit b, where $\tilde{b} \in \{0,1\}^n$ represents the n-bit string obtained from b' after omitting the m of the n+m qubits randomly selected by the second party.

In one aspect, only one party has the capability of applying arbitrary quantum gates to quantum states, while the first party has only the capability to apply NOT gates to qubits.

Preferably, the parties do not agree on an encoding of the bits before performing the two-stage QKD operations.

Coalitions-resilient secure multi-party XOR computation may be performed, by:

a) a first participant randomly picks $b \in \{0,1\}$ uniformly and uses the random basis encryption to generate an encryption $\psi_b$ of b;

for $1 \leq i \leq N$:

b) if $b_i=1$, then another party $\mathcal{P}_i$ applies a NOT gate to the received qubit;

c) $\mathcal{P}_i$ transmits the qubit to the next participant;

d) $\mathcal{P}_1$ decrypts the received qubit to obtain an outcome b'; and e) computing $b \otimes b'$, a first participant obtains the desired XOR of the bits of all the participants and sends the result to the all participants.

At each stage, the qubit may be received by a participant $\mathcal{P}_i$ is an encryption of a random bit.

In one aspect, measuring the encryption-qubit, $\mathcal{P}_i$ obtains zero and one with equal probabilities, regardless of the actual value of the encrypted bit.

Any gate that commutes with the family of unitary matrices K, defined in |Enc|, may be applied homomorphically to the encrypted data.

A computer being capable of distributing a quantum key for performing information-theoretically secure quantum gate computation, comprising at least one processor adapted to:

a) generate a quantum key $k=(\theta, \varphi)$ by selecting a uniformly random pair $(\theta, \varphi)$ from $$[0, 2\pi] \times \left\{\frac{\pi}{2}, -\frac{\pi}{2}\right\};$$

b) set an element $$\psi_0 = \cos\left(\frac{\theta}{2}\right) + e^{i\varphi}\sin(\theta/2),$$

as an encryption of "0" using the quantum key $k=(\theta, \varphi)$ as the encryption key;

c) set an element $\psi_1 = \sin(\theta/2) - e^{i\varphi} \cos(\theta/2)$ to be the encryption of "1" using the key, such that $\psi_0$ and $\psi_1$ are orthogonal.

d) constitute a random orthonormal basis $B_{(\theta, \varphi)}$; and e) select $\varphi=\pm\pi/2$, such that the random orthonormal basis is $$B_{(\theta, \pm\frac{\pi}{2})} = \{\cos(\theta/2) \pm i\sin(\theta/2), \sin(\theta/2) \mp i\cos(\theta/2)\},$$

for setting $\psi_0$ to be equal to NOT$\psi_1$ and vice versa.

A quantum key distribution system adapted to perform two-stage information-theoretically secure and WM attacks resilient Quantum Key Distribution (QKD) between two transceivers implementing parties that should share one or more quantum keys, comprising:

a) a first transceiver implementing a first party randomly selects bits $b'=b_1, \ldots b_{n+m}'$ from $\{0,1\}^{n+m}$;

b) for $1 \leq i \leq n+m$, the first party generates an independent encryption $\psi_{b'_i}$ of $b'_i$, using the random basis;

c) the first party transmits the independent encryption $\psi_{b'_i}$ to a second transceiver implementing a second party;

d) the second party randomly selects m of the n+m qubits received from the first party and communicates with the first party over a public channel, while announces the positions of the selected m qubits;

e) the second party reveals the keys used for encrypting the m qubits;

f) the first party decrypts the m qubits using the keys obtained at the preceding step, while announcing the outcomes to the second party;

g) the second party checks the correctness of the outcomes to detect possible adversarial eavesdropping attempts by measuring the error rate;

h) if the error rate is below a predetermined value, i) the first party uses the unmeasured n qubits, and for $1 \leq i \leq n$, if $b_i=1$ a first party applies a NOT gate to the i'th qubit, otherwise the i'th qubit remains unchanged;

j) the first party sends the unmeasured n qubits back to the second party;

k) the second party decrypts the unmeasured n qubits to obtain a string b";

l) the second party computes $b'' \otimes \tilde{b}$ to obtain the qubit b, where $\tilde{b} \in \{0,1\}^n$ represents the n-bit string obtained from b' after omitting the m of the n+m qubits randomly selected by the second party.

The random basis QKD may encode both 0 and 1 as the same qubit.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

Figure 7:
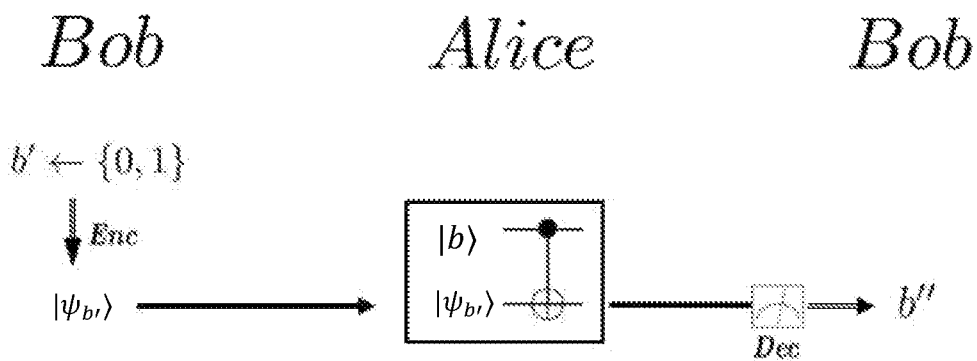
Figure 8:
Figure 9:
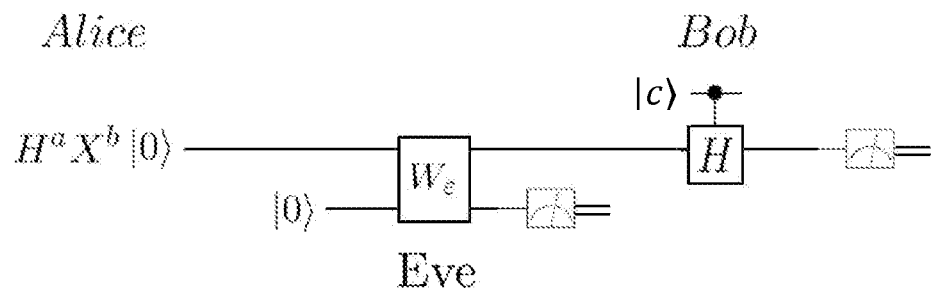
Figure 10:
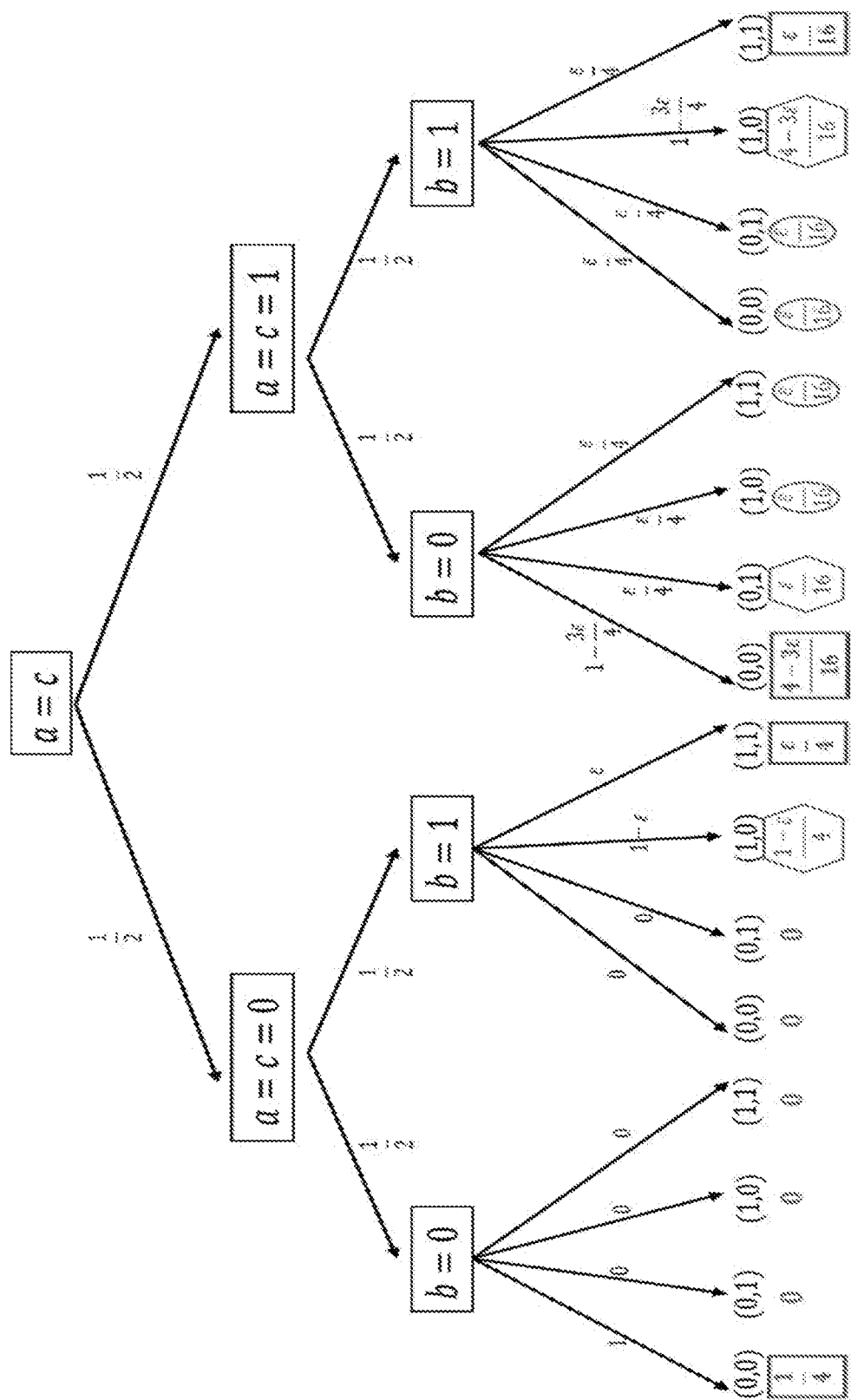
Figure 11:
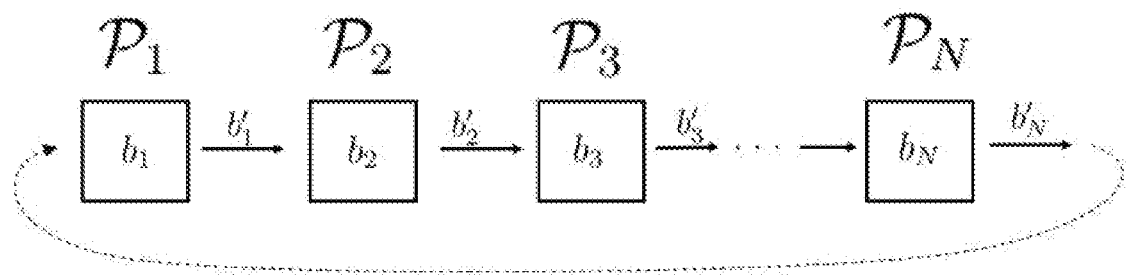
Figure 12:
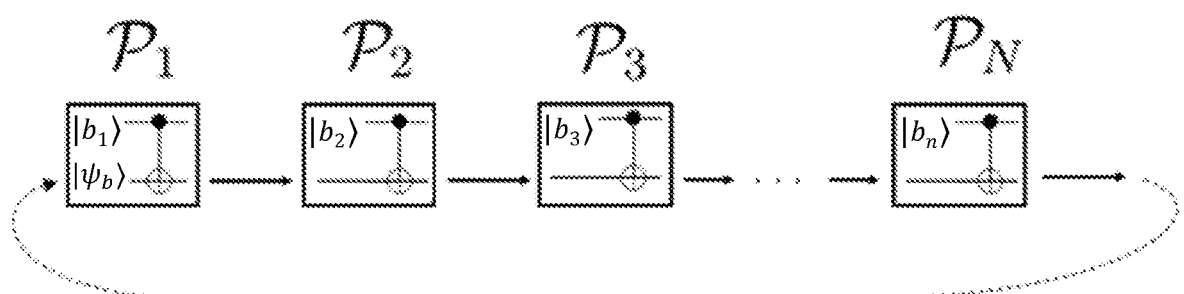

Alice and Bob may follow the scheme of sharing key by random base, as illustrated in FIG. 7 illustrates a scheme of sharing key by random base;

FIG. 8 illustrates the use of BB84 QKD protocol between the parties;

FIG. 9 illustrates the Weak Measurement (WM) attack;

FIG. 10 illustrates a decision tree of the probabilities of possible outcomes for the WM attack;

FIG. 11 illustrates a trivial solution to the multi-party XOR computation problem; and FIG. 12 shows the coalitions-resilient solution to the multi-party XOR computation problem.

DETAILED DESCRIPTION OF THE INVENTION

The present invention provides a system and method for encrypting and outsourcing the storage of classical data, while enabling IT-secure quantum gate computations over the encrypted data. The proposed method is based on using a specific family of random bases to encrypt classical bits. The proposed schemes support fully-compact IT-secure homomorphic evaluation of NOT gates, and a modified version of the Hadamard gate, which is useful in several applications.

The proposed schemes can also support CNOT gates, where the control qubits are set in a non-random basis (i.e., plaintext qubits). This implies that cascading is possible only in specific (important) cases The proposed schemes specifies several applications, including random basis QKD and coalitions-resilient secure multi-party XOR computation.

The proposed QHE schemes support these applications, while maintaining IT-security, full compactness, perfect correctness, and non-interactivity. These attributes makes the proposed scheme computation agnostic, with safer security implications against weak measurements. The proposed schemes are based on adding extra randomness which implies safer security against weak measurements. This allows encrypting and outsourcing storage of classical data, while enabling quantum gate computations over the encrypted data. Instead of using typical computational basis, the proposed schemes use randomized bases to represent strings of classical bits, {|0i, |1i}, and are perfectly secure (rather than only computationally secure).

The proposed method suggests perfectly secure implementation of CNOT and Hadamard gates, where the control qubits are set in non-randomized based. This implementation has important applications, including coalitions-resilient secure multi-party XOR computation, randomized base CNOT QKD, and secure Quantum Pseudo-Telepathy scheme.

The Random Basis Encryption Scheme

The goal is encrypting the classical bits 0 and 1 while enabling some operations to be performed homomorphically over the ciphertext. Typically, these bits are encoded in quantum computation as the elements 0 and 1 of the standard basis of $\mathbb{H} = \mathcal{C}^2$. Of course, that encoding is by no means an encryption of the bits. Approaching proper encryption, we take some random $(\theta, \varphi) \in [0, 2\pi]^2$, set $$\psi_0 = \cos\left(\frac{\theta}{2}\right) + e^{i\varphi}\sin(\theta/2),$$

and think of $\psi_0$ as an encryption of 0 using $(\theta, \varphi)$ as the encryption key. The plaintext qubits 0 and 1 are orthogonal. To maintain orthogonality of the ciphertext, we set $\psi_1 = \sin(\theta/2) - e^{i\varphi}\cos(\theta/2)$ to be the encryption of 1 using the same key. One may readily verify that $\psi_0$ and $\psi_1$ are orthogonal. For random $(\theta, \varphi) \in [0, 2\pi]^2$, the elements $\psi_0$ and $\psi_1$ constitute a random orthonormal basis of $\mathbb{H}$, denoted $B_{(\theta, \varphi)}$. Now, as mentioned, we want that encryption to support some homomorphic operations in a fully-compact non-interactive IT-secure way. First, we require supporting homomorphic NOT gates. We want $\psi_0$ to be equal (up to a global phase factor) to NOT$\psi_1$ (and vice versa). A straight forward computation shows that this requirement compels $\varphi = \pm \pi/2$. Hence, for $$(\theta, \varphi) \in [0, 2\pi] \times \left\{\pm \frac{\pi}{2}\right\},$$

the random basis $$B_{(\theta, \pm \frac{\pi}{2})} = \{\cos(\theta/2) \pm i\sin(\theta/2), \sin(\theta/2) \mp i\cos(\theta/2)\}$$

is NOT-invariant.

The inability of determining the coordinates of an arbitrary qubit, given a realization of it, give rise to the following QHE scheme of classical data, which allows a user to outsource the storage of confidential information to an untrusted server.

Gen (key generation): Output a uniformly random pair $(\theta, \varphi)$ from $$[0, 2\pi] \times \left\{\frac{\pi}{2}, -\frac{\pi}{2}\right\}.$$

Enc (encryption): On input message $b \in \mathcal{M}$ and a key $k=(\theta, \varphi)$:
Generate the qubit b.
Let $$K = \begin{pmatrix} \cos(\theta/2) & \sin(\theta/2) \\ e^{i\varphi}\sin(\theta/2) & -e^{i\varphi}\cos(\theta/2) \end{pmatrix} \in M_2(\mathbb{C})$$

and apply K to b to obtain q=Kb.
Output q.
Dec (decryption): On input ciphertext $\psi$ and a key $k=(\theta, \varphi)$:
Let $K^\dagger$ denote the conjugate transpose of K, where K is as in Enc and apply $K^\dagger$ to $\psi$.
Measure $K^\dagger \psi$ in reference to the computational basis.
Output the outcome of the measurement.

The matrix K defined in the scheme is the unitary matrix whose columns are the elements of $B_{(\theta, \varphi)}$. Multiplying the elements of the computational basis, $\{0,1\}$ by K, we obtain the elements of $B_{(\theta, \varphi)}$. We refer to the encryption algorithm as taking the elements of the computational basis to the elements of the random basis $B_{(\theta, \varphi)}$. Since K is a unitary transformation, $K^\dagger$ is its inverse, and hence, given $(\theta, \varphi)$, the decryption algorithm takes the elements of $B_{(\theta, \varphi)}$ to the elements of the computational basis. Of course, the scheme may be applied bit-wise to a string x of classical bits to enable outsourcing the storage of x to an untrusted quantum server. The scheme is perfectly correct. Indeed, assuming that q is the encryption of $b \in \{0,1\}$ using $(\theta, \varphi)$. By Enc, q=Kb. In Dec, $K^\dagger$ is applied to q. One has $K^\dagger q=K^\dagger Kb=b$. Since b is a pure state, measuring it in reference to the computational basis, we get b with probability 1.

Security Proof of the Random Basis Encryption Scheme

It is possible to prove that the random basis encryption scheme is IT-secure using two different ways. First, the proposed scheme deals with encrypting and computing over classical data, a proof is provided based on standard security definitions of classical schemes, by using a variant of a standard privacy definition from [LK14]. The second proof follows a standard privacy definition from the quantum setting derived from [AMTdW00].

An encryption scheme is composed of three algorithms, Gen, Enc and Dec. $\mathcal{M}$, $\mathcal{K}$ and $\mathcal{C}$ are the message space, key space and ciphertext space of the scheme, respectively. In our case, $\mathcal{M} = \{0,1\}$ and $$\mathcal{K} = [0, 2\pi] \times \left\{\pm \frac{\pi}{2}\right\}.$$

What is $\mathcal{C}$? On the one hand, $\mathcal{C}$ is the set of possible outputs of Enc, implying that $\mathcal{C} = \mathbb{H}$. On the other hand, a ciphertext cannot indicate the encrypted information if it is not read. To read information from a qubit, one must measure that qubit. The output of such a measurement is an element of $\{0,1\}$, implying that $\mathcal{C} = \{0,1\}$. The first (classical approach) proof uses the latter interpretation of $\mathcal{C}$, and the second (quantum approach) proof uses the former.

We begin with the classical approach. Assume that an adversary is holding an encryption q of b generated using some key $(\theta, \varphi) \in \mathcal{K}$. The adversary wishes to use q to find b, or to gain any information that will enable a better guess of b. The adversary is only able to measure q in reference to any orthonormal basis he chooses. If the measurement is performed in reference to any orthonormal basis other than $B_{(\theta,\varphi)}$, then each of the outcomes zero or one may be obtained with positive probability. We now rigorously prove that, no matter which orthonormal basis $B_{(\theta_0,\varphi_0)}$ is used by the adversary to measure q, the probability of each of the outcomes zero or one is ½, regardless of the actual value of b.

We now define the security criterion. Since Gen is a probabilistic algorithm, given a message $m \in \mathcal{M}$, the probability distribution over $\mathcal{K}$ induces a probability distribution over $\mathcal{C}$. An encryption scheme is perfectly secure if all messages $m \in \mathcal{M}$ induce the same probability distribution over $\mathcal{C}$. Formally (see [LK14, Lemma 2.3]):

Definition 1. An encryption scheme (Gen, Enc, Dec) over a message space $\mathcal{M}$, is perfectly secure if for every probability distribution over $\mathcal{M}$, every $m_0, m_1 \in \mathcal{M}$, and every $c \in \mathcal{C}$:

$$Pr[C=c|M=m_0]=Pr[C=c|M=m_1],$$

where C and M are the random variables denoting the value of the ciphertext and the message, respectively.

By Definition 1, perfect security of the random basis encryption scheme follows from Lemma 2. Let $(\theta_0,\varphi_0) \in [0,2\pi]^2$. One has $$Pr[M(\psi_0, B_{(\theta_0,\varphi_0)})=0]=Pr[M(\psi_1, B_{(\theta_0,\varphi_0)})=0], \qquad (6)$$

where
$B_{(\theta_0,\varphi_0)}$ is the orthonormal basis used by an adversary to measure an encryption of a bit,
$\psi_0$ and $\psi_1$ are as in (4), and are encryptions of zero and one, obtained using our scheme,
$M(\psi, B_{(\theta_0,\varphi_0)})$ is the random variable denoting the result obtained when measuring $\psi$ in reference to $B_{(\theta_0,\varphi_0)}$,
the probability is over the choice of $(\theta,\varphi)$ from $[0,2\pi]^2$ and the inherent randomness of quantum measurements.

Proof. We begin with computing the expression on the left-hand side $Pr[M(\psi_0, B_{(\theta_0,\varphi_0)})=0]$ of (6). That is, computing the probability of obtaining the outcome zero when measuring $\psi_0$ in reference to $B_{(\theta_0,\varphi_0)}$ in terms of $\theta$ and $\varphi$. This probability is the square of the absolute value of the first coordinate of $\psi_0$ in the orthonormal basis $B_{(\theta_0,\varphi_0)}$. Denote by $\upsilon_0$ and $\upsilon_1$ the elements of $B_{(\theta_0,\varphi_0)}$. As mentioned in (5), the coordinates of $\psi_0$ in $B_{(\theta_0,\varphi_0)}$ are given by appropriate inner products. Define $\alpha_0, \beta_0 \in \mathbb{C}$ by $\psi_0 = \alpha_0 \upsilon_0 + \beta_0 \upsilon_1$. One has $$\alpha_0 = \upsilon_0 | \psi_0 = \begin{pmatrix} \cos(\theta_0/2) \\ e^{i\varphi_0}\sin(\theta_0/2) \end{pmatrix} \begin{pmatrix} \cos(\theta/2) \\ e^{i\varphi}\sin(\theta/2) \end{pmatrix} =$$
$$\cos(\theta_0/2)\cos(\theta/2) + e^{i(\varphi-\varphi_0)}\sin(\theta_0/2)\sin(\theta/2).$$

Multiplying by $\alpha_0^*$, and using routine trigonometric identities, we obtain:

$$|\alpha_0|^2 = \frac{1}{2}\left[\cos^2\frac{\theta+\theta_0}{2} + \cos^2\frac{\theta-\theta_0}{2} + \sin\theta\sin\theta_0\cos(\varphi-\varphi_0)\right]. \qquad (7)$$

Now, $\theta$ and $\varphi$ are chosen uniformly random from $$[0, 2\pi] \times \left\{\pm \frac{\pi}{2}\right\}.$$

The mean value of $|\alpha_0|^2$ over that domain may be computed in various ways. One may compute it using the formula $$\bar{f} = \frac{1}{Vol(U)} \int_U f,$$

which yields ½. By the law of total probability, the right-hand side of (6) is also ½. All in all, we have $$Pr[M(\psi_0,(\theta_0,\varphi_0))=0] = Pr[M(\psi_1,(\theta_0\psi_0))=0] = \text{½}.$$

This concludes the classical proof. We have shown that, no matter which orthonormal basis is chosen by the adversary to measure q, the outcome 0 will be obtained with probability ½, regardless of the actual value of b. By the laws of quantum mechanics, any operation other than measuring the qubit will yield less information regarding the plaintext. Since measuring the qubit gives no information at all, the scheme is perfectly secure. We now turn to the quantum approach, which interprets the ciphertext space as $\mathbb{H}$. We use the density matrix representation of quantum states and base our claims on a security definition which follows the same line as Definition 3.1 from [AMTdW00] (modified for the continuous setting of our scheme).

Definition 2. Let $S \subseteq \mathbb{H}$ be a set of qubits, $\varepsilon = \{U_i : i \in 1\}$ be a set of unitary mappings on $\mathbb{H}$, and $\rho_0$ be some density matrix. Uniformly at random applying an element of $\varepsilon$ to a given element $s \in S$ perfectly hides $s$ if and only if for all $s \in S$ we have $$\int_I U_i s s U_i^\dagger = \rho_0.$$

In our case, $$S = \{0, 1\}, \text{ and } \mathcal{E} = \left\{ \begin{pmatrix} \cos(\theta/2) & \sin(\theta/2) \\ e^{i\varphi}\sin(\theta/2) & -e^{i\varphi}\cos(\theta/2) \end{pmatrix} : (\theta, \varphi) \in \mathcal{K} \right\}.$$

To show that the random basis encryption scheme is perfectly secure, we need to show that $$\int_{\mathcal{K}} K_{\theta,\varphi} 00 K_{\theta\varphi}^\dagger = \int_{\mathcal{K}} K_{\theta\varphi} 11 K_{\theta\varphi}^\dagger, \tag{8}$$

where $$K_{\theta\varphi} = \begin{pmatrix} \cos(\theta/2) & \sin(\theta/2) \\ e^{i\varphi}\sin(\theta/2) & -e^{i\varphi}\cos(\theta/2) \end{pmatrix}.$$

Routine computation shows that the left- and right-hand side of (8) are equal. To conclude, the density matrix that an adversary sees after encryption is the same, regardless of the input. This shows that the random basis encryption scheme is perfectly secure. We note that, since the evaluation algorithm is non-interactive, the adversary gains no new information executing it, and hence the scheme is secure.

Remark 1. In the key generation algorithm of our random basis encryption scheme, the user is required to pick a uniformly random element $\theta$ from $[0, 2\pi]$. Implementing random choices from a continuous domain might be technically challenging. However, the set of keys may be made discrete as follows. Let N a positive integer, and $$\mathcal{K}_N = \left\{ \frac{2\pi n}{N} : n \in \{1, 2, \ldots N\} \right\}.$$

Instead of picking $\theta$ from $[0,2\pi]$, the user may uniformly at random pick $\theta$ from $\mathcal{K}_N$. How does that affect the security? In the classical security proof above, the mean value of the right hand side of (7) was computed by integrating over $[0,2\pi]$. Replacing $[0,2\pi]$ with $\mathcal{K}_N$, we compute the mean value of the right hand side of (7) by summing over all the possibilities for $\theta$ divided by N. Now, it is well known that for any real continuous function $f$, $$\int_{[0,2\pi]} f(x) dx = \lim_{N \to \infty} \sum_{n=1}^{N} \frac{2\pi}{N} f\left(\frac{2\pi n}{N}\right).$$

Hence, by taking large enough N, the mean value of the discrete version can be made arbitrarily close to ½. In the quantum proof, by similar arguments, we can make the left- and right-hand sides of (8) arbitrarily close to each other by taking large enough N. To conclude, taking the discrete version of the key space, we make Gen easier to implement in the cost of making the scheme statistically secure (rather than perfectly secure). Either way, the scheme is IT-secure.

Quantum Gate Computations

The possibility of homomorphically applying quantum gates to the ciphertext by the distrustful quantum server is examined. Obviously, any gate that commutes (up to a global phase factor) with the family of the encryption gates K, may be homomorphically applied to the encrypted data. Several unitary operations are typically used in quantum computing. The consequences of applying some of these typically-used quantum gates to a random basis $B_{(\theta,\varphi)}$ encryption of classical data is analyzed.

The NOT gate. The NOT gate is the unitary transformation that interchanges the elements of the computational basis: b→1−b. The matrix representation of NOT in the computational basis is $$X = \begin{pmatrix} 0 & 1 \\ 1 & 0 \end{pmatrix}.$$

What happens when one applies an X gate to an element of a random basis $B_{(\theta,\varphi)}$? A simple calculation shows that, applying an X gate to an element of $B_{(\theta,\varphi)}$ we get the other element of that basis, up to a global phase factor. Since $e^{i\varphi}=\pm i$, we have $$X\psi_0 = \begin{pmatrix} 0 & 1 \\ 1 & 0 \end{pmatrix} \begin{pmatrix} \cos(\theta/2) \\ \pm i\sin(\theta/2) \end{pmatrix} = \begin{pmatrix} \pm i\sin(\theta/2) \\ \cos(\theta/2) \end{pmatrix} = \pm i \begin{pmatrix} \sin(\theta/2) \\ \mp i\cos(\theta/2) \end{pmatrix} = \pm i\psi_1.$$

Similarly, $X\psi_1 = \mp \psi_0$. To conclude, applying a NOT gate to elements of $B_{(\theta,\varphi)}$ we get the same effect as when applying it to an element of the computational basis. Consequently, X gates may be homomorphically applied to encrypted data.

The Hadamard Gate

The Hadamard gate is the unitary transformation, whose matrix representation in the computational basis is $$H = \frac{1}{\sqrt{2}} \begin{pmatrix} 1 & 1 \\ 1 & -1 \end{pmatrix}.$$

H takes the elements of the computational basis to the elements of $$B_{(\frac{\pi}{4},0)} = \left\{ \frac{1}{\sqrt{2}} \begin{pmatrix} 1 \\ 1 \end{pmatrix}, \frac{1}{\sqrt{2}} \begin{pmatrix} 1 \\ -1 \end{pmatrix} \right\}.$$

When measuring any of the $$B_{(\frac{\pi}{4},0)}$$

in reference to the computational basis, the probabilities of obtaining zero or one are both ½. What happens when one applies H to an element of a random basis $B_{(\theta,\varphi)}$? Explicitly, what are the probabilities of obtaining zero or one when measuring an element of $H[B_{(\theta,\varphi)}]$ in reference to $B_{(\theta,\varphi)}$? By Equation (5) (in the appendix), the probability of obtaining zero when measuring $H\psi_0$ in reference to $B_{(\theta,\varphi)}$ is the square of the absolute value of the inner product of $H\psi_0$ and $\psi_0$. Since $$H\psi_0 = \frac{1}{\sqrt{2}} \begin{pmatrix} 1 & 1 \\ 1 & -1 \end{pmatrix} \begin{pmatrix} \cos(\theta/2) \\ \pm i\sin(\theta/2) \end{pmatrix} = \frac{1}{\sqrt{2}} \begin{pmatrix} \cos(\theta/2) \pm i\sin(\theta/2) \\ \cos(\theta/2) \mp i\sin(\theta/2) \end{pmatrix}, \quad (1)$$

the inner product is $$\langle \psi_0 | H | \psi_0 \rangle = \frac{\cos\theta}{\sqrt{2}}.$$

Taking the square of the result, one finds that the probability of obtaining a zero outcome when measuring $H\psi_0$ in reference to $B_{(\theta,\varphi)}$, is $$\frac{\cos^2\theta}{2}.$$

Since the probabilities add up to one, when measuring $H\psi_0$ in reference to $B_{(\theta,\varphi)}$ the outcome one is obtained with probability $$\frac{1 + \sin^2\theta}{2}.$$

Similar computations yield similar results for $\psi_1$. Explicitly, when measuring $H\psi_1$ in reference to $B_{(\theta,\varphi)}$, the probability of obtaining the outcome one is $$\frac{\cos^2\theta}{2}$$

and the probability of obtaining the outcome zero is $$\frac{1 + \sin^2\theta}{2}.$$

To conclude, applying a Hadamard gate to an element of a random basis, the probabilities of the elements of the basis in the superposition we get are in general not ½ each.

These results are rather unfortunate since they imply that the Hadamard gate does not create an equally weighted superposition when applied to an element of a random basis, and hence cannot be applied to the encrypted data homomorphically. There is a quantum gate that takes elements of every $B_{(\theta,\varphi)}$ basis to an equally weighted superposition of the elements of that basis in the form of the following quantum gate that uses an ancillary 0 qubit:

$$D = \frac{1}{\sqrt{2}} \begin{pmatrix} 1 & 0 & 1 & 0 \\ 0 & 1 & 0 & 1 \\ 0 & 1 & 0 & -1 \\ 1 & 0 & -1 & 0 \end{pmatrix}$$

Figure 1:
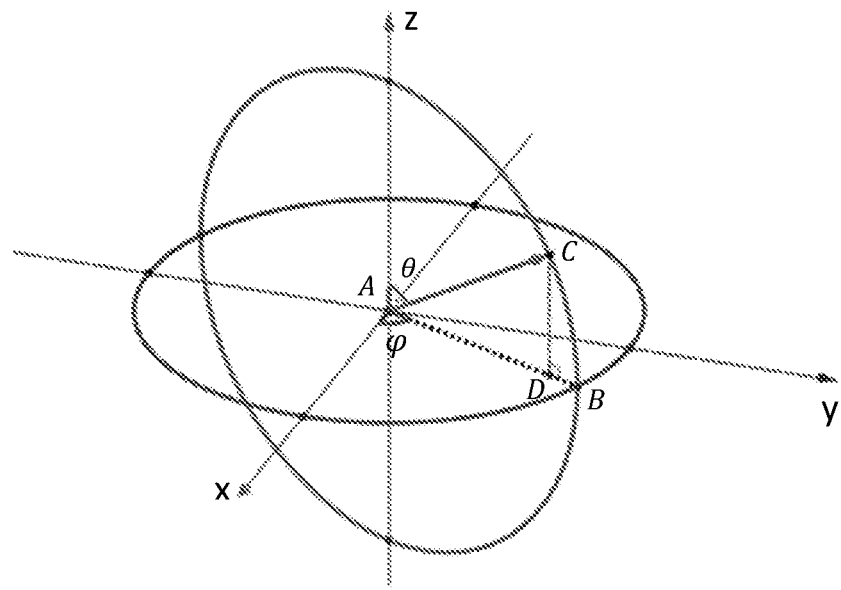
FIG. 1 (prior art) illustrates a representation of a qubit as a unit vector in $\mathbb{R}^3$.
Figure 2:
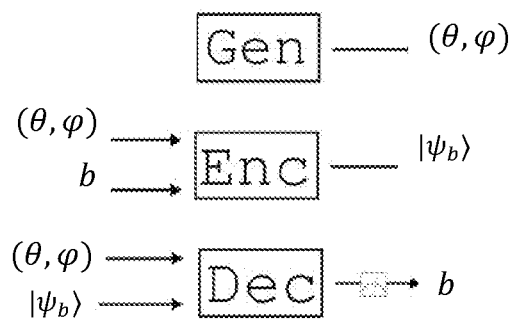
FIG. 2 is an example of an HE scheme.
Figure 3:
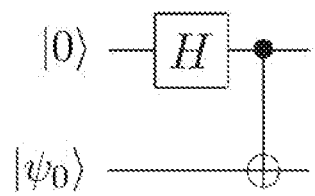
FIG. 3 shows a Random Based D gate.

D is the matrix representation (in the computational basis) of the quantum gate used in [EPR35] to create Bell states. This gate is the two-qubit quantum circuit established by first applying a Hadamard gate to the first qubit, and then a CNOT gate to that system of two qubits, where the first qubit is the control qubit and the second is the target qubit. This circuit is illustrated in FIG. 3.

By applying a D gate to a tensor product of 0 and an element of a random basis, measuring the second qubit in reference to that same random basis, the probabilities of obtaining the outcomes zero and one are both ½. Explicitly, let $\psi_b$ an element of a random basis, $B_{(\theta,\varphi)}$, where $\varphi=$ and $\theta \in [0,2\pi]$. We have Lemma 1: D is a quantum gate which takes tensor products of the form $0\psi_b$ to a system of two qubits, such that, measuring that system in reference to $\{0,1\} \otimes B_{(\theta,\varphi)}$, the probability of each of the outcomes zero and one for the second qubit is ½.

Proof of Lemma 1

Proof. Let $\theta \in [0,2\pi]$ and $\varphi=\pm i$. One has:

$$|0\psi_0\rangle \begin{pmatrix} 1 \\ 0 \end{pmatrix} \otimes \begin{pmatrix} \cos(\theta/2) \\ \pm i\sin(\theta/2) \end{pmatrix} = \begin{pmatrix} \cos(\theta/2) \\ \pm i\sin(\theta/2) \\ 0 \\ 0 \end{pmatrix},$$

$$D|0\psi_0\rangle = \frac{1}{\sqrt{2}} \begin{pmatrix} 1 & 0 & 1 & 0 \\ 0 & 1 & 0 & 1 \\ 0 & 1 & 0 & -1 \\ 1 & 0 & -1 & 0 \end{pmatrix} \begin{pmatrix} \cos(\theta/2) \\ \pm i\sin(\theta/2) \\ 0 \\ 0 \end{pmatrix} = \frac{1}{\sqrt{2}} \begin{pmatrix} \cos(\theta/2) \\ \pm i\sin(\theta/2) \\ \mp i\sin(\theta/2) \\ \cos(\theta/2) \end{pmatrix}$$

The probabilities of obtaining each of the possible outcomes, when measuring $D0\psi_0$ in reference to $\{0,1\} \otimes B_{(\theta,\varphi)}$, are the squares of the absolute values of the coordinates of $D0\psi_0$ in that basis. The elements of $\{0,1\} \otimes B_{(\theta,\varphi)}$ are $0\psi_0$, $0\psi_1$, $1\psi_0$ and $1\psi_1$. The first, $\theta\psi_0$, has been computed in (9). Now, $$|1\psi_1\rangle = \begin{pmatrix} 0 \\ 1 \end{pmatrix} \otimes \begin{pmatrix} \sin(\theta/2) \\ \mp i\cos(\theta/2) \end{pmatrix} = \begin{pmatrix} 0 \\ 0 \\ \sin(\theta/2) \\ \mp i\cos(\theta/2) \end{pmatrix}$$

By (9) and (10), $$\frac{|0\psi_0\rangle \pm i|1\psi_1\rangle}{\sqrt{2}} = \frac{1}{\sqrt{2}}\begin{pmatrix} \cos(\theta/2) \\ \pm i\sin(\theta/2) \\ \pm i\sin(\theta/2) \\ \cos(\theta/2) \end{pmatrix} = D|0\psi_0\rangle$$

This shows that the coordinates of $D0\psi_0$ in $\{0,1\}\otimes B_{(\theta,\varphi)}$ are $$\frac{1}{\sqrt{2}},$$

0,0 and $$\frac{\pm i}{\sqrt{2}}.$$

Taking the squares of the absolute values of these coordinates one sees that, measuring in reference to $\{0,1\}\otimes B_{(\theta,\varphi)}$, the outcome 00 is obtained with probability ½, as so is 11. The probabilities of obtaining the different outcomes when measuring $D0\psi_1$ in reference to $\{0,1\}\otimes B_{(\theta,\varphi)}$ may be found by substituting $\theta=\pi-\theta'$ and $\varphi=-\varphi'$. That substitution yields $$D0\psi_1 = \frac{0\psi_1 \mp i1\psi_0}{\sqrt{2}}.$$

Taking the squares of the absolute values, the desired probabilities are obtained.

To conclude, the D gate may be homomorphically applied to the elements of a random basis, using an ancillary 0 qubit, resulting in the same effect as when applying a Hadamard gate to the elements of the computational basis—creating a superposition of the elements of that basis with equal probabilities. The ancillary qubit may be generated by the server with no interference of or interaction with the user.

The CNOT gate. The CNOT gate is a two-qubit gate, whose matrix representation in the computational basis of $\mathbb{H}^{\otimes 2}$ is $$\begin{pmatrix} 1 & 0 & 0 & 0 \\ 0 & 1 & 0 & 0 \\ 0 & 0 & 0 & 1 \\ 0 & 0 & 1 & 0 \end{pmatrix}.$$

Tensor products of the elements of the computational basis $\{0,1\}$ of $\mathbb{H}$, give the computational basis $\{00,01,10,11\}$ of $\mathbb{H}^{\otimes 2}$. Applying the CNOT gate to the elements of the latter basis, we leave 00 and 01 unchanged, and interchange 10 and 11. In other words, if the first qubit is 0, then the second qubit is left unchanged, and if the first qubit is 1, then a NOT gate is applied to the second qubit. For this reason, this gate is called the controlled-NOT gate. The first qubit is the control qubit and the second is the target qubit.

What happens if one applies a CNOT gate to the elements of a random basis of $\mathbb{H}^{\otimes 2}$? Namely, let $B_{(\theta,\varphi)}=\{\psi_0, \psi_1\}$ and $B_{(\theta,\varphi)}=\{\psi'_0, \psi'_1\}$ two orthonormal bases of $H$. Tensor products of the elements of $B_{(\theta,\varphi)}$ and $B_{(\theta',\varphi')}$ give the following orthonormal basis of $\mathbb{H}^{\otimes 2}$:

$$\{\psi_0\psi'_0, \psi_0\psi'_1, \psi_1\psi'_0, \psi_1\psi'_1\}.$$

Is the control-target structure kept when applying CNOT to the elements of that basis, leaving $\psi_0\psi'_0$ and $\psi_0\psi'_1$ unchanged, and interchanging $\psi_1\psi'_0$ and $\psi_1\psi'_1$? The answer turns out to be negative. Applying a CNOT gate to these elements, we take each of them to a superposition of the others.

It is not possible to find a quantum gate (using ancillary qubits, perhaps) that keeps the control-target structure when applied to the elements of a random basis of $\mathbb{H}^{\otimes 2}$. For example, if such a gate P exists, it must leave $\psi_0\psi_0$ unchanged and take $\psi_1\psi_1$ to $\psi_1\psi_0$, regardless of $\theta$ and $\varphi$. Taking $\theta'=\pi-\theta$ and $\varphi'=\pi-\varphi$, we switch between $\psi_0$ and $\psi_1$, implying a contradiction when examining P's operation on $\psi_0\psi_0$ and $\psi_1\psi_1$. For example, consider the following two cases. First, if $\theta=0$ and $\varphi=\pi$, we have $\psi_0=0$ and $\psi_1=1$. Second, if $\theta=\pi$ and $\varphi=0$, we have $\psi_0=1$ and $\psi_1=0$. In the first case, $P\psi_0\psi_0=P00$ and $P\psi_1\psi_1==P11$, implying that 00 is unchanged by P and 11 is taken to 10. On the other hand, in the second case, $P\psi_0\psi_0=P11$ and $P\psi_1\psi_1=P00$, implying that 11 is unchanged and 00 is taken to 01. By the first case, 00 is unchanged, but by the second case, it is taken to 01. The contradiction shows that such a P cannot exist. Nevertheless, by applying a CNOT gate to the elements of a partially-random basis $\{0,1\}\otimes B_{(\theta,\varphi)}$ of $\mathbb{H}^{\otimes 2}$ we do keep the target-control structure. The elements of such a basis are $$0\psi_0=\cos(\theta/2)\pm i\sin(\theta/2)00, 0\psi_1=\sin(\theta/2)\mp i\cos(\theta/2)$$
$$00,1\psi_0=00 \quad \cos(\theta/2)\pm i \quad \sin(\theta/2),1\psi_1=$$
$$00\sin(\theta/2)\mp i\cos(\theta/2).$$

Applying a CNOT gate to these elements, we leave $0\psi_b$ unchanged and interchange $1\psi_b$ and $1\psi_{1-b}$, up to a global phase factor. In fact, $$CNOT1\psi_0 = \begin{pmatrix} 1 & 0 & 0 & 0 \\ 0 & 1 & 0 & 0 \\ 0 & 0 & 0 & 1 \\ 0 & 0 & 1 & 0 \end{pmatrix}\begin{pmatrix} 0 \\ 0 \\ \cos(\theta/2) \\ \pm i\sin(\theta/2) \end{pmatrix} = \qquad (2)$$

$$\begin{pmatrix} 0 \\ 0 \\ \pm i\sin(\theta/2) \\ \cos(\theta/2) \end{pmatrix} = \pm i\begin{pmatrix} 0 \\ 0 \\ \sin(\theta/2) \\ \mp i\cos(\theta/2) \end{pmatrix} = \pm i1\psi_1,$$

and a similar computation shows that $CNOT1\psi_1=\mp i1\psi_0$. Since the last two entries of $0\psi_b$ are zero, applying a CNOT gate we leave them unchanged. To conclude, CNOT gates may be homomorphically applied to systems of two qubits when the control qubit is an element of the computational basis and the target qubit is an element of $B_{(\theta,\varphi)}$.

$C^n$NOT gates. For a positive integer n, the $C^n$NOT gate is an n+1 qubit gate, whose matrix representation in the computational basis of $\mathbb{H}^{\otimes(n+1)}$ is the matrix obtained from the identity matrix of order $2^{n+1}$ by replacing its bottom right block 1001 with the block 0110. Namely, the NOT and CNOT gates discussed above are the special cases n=0 and n=1, respectively, of $C^n$NOT. Similarly to (2), one may readily verify that, given a random basis $B_{(\theta,\varphi)}$, $$C^nNOTb_1b_2\ldots b_n\psi_b = \begin{cases} b_1b_2\ldots b_n\psi_{1-b}, & \prod_{i=1}^n b_i = 1, \\ b_1b_2\ldots b_n\psi_b, & \text{otherwise.} \end{cases} \quad (3)$$

Hence, $C^nNOT$ gates may be homomorphically applied to systems of qubits when the control qubits are elements of the computational basis and the target qubit is an element of $B_{(\theta,\varphi)}$.

It can be seen that the proposed scheme supports homomorphic NOT operations, and a modified version of the Hadamard gate. It also supports homomorphic CNOT gates, where the control qubits are set in clear.

Securing Entanglement

Entanglement is an essential resource in quantum computation. Once generated, it should be guaranteed that only the rightful owners of it may be able to use it. Our scheme provides a way of securing that important resource in an IT-secure way. One example of a setting in which entanglement may be secured using the proposed scheme is shown below.

The phrase Quantum Pseudo-Telepathy was first introduced in [BBT03], and refers to the use of quantum entanglement to eliminate the need for communication in specific multi-party tasks. A comprehensive coverage of the subject may be found in [BBT05]. The simplest example of quantum pseudo-telepathy comes from the Mermin-Peres magic square game [Mer90]. In that game, two parties, Alice and Bob, are presented with a 3×3 table. Each of them is required to fill in a part of the table, as follows. Alice is given a number i, $1 \le i \le 3$, and needs to put either 0 or 1 at each entry of the i-th row, in such a way that the sum of the three entries will be even. Similarly, Bob is given a j, $1 \le j \le 3$, and needs to fill in the j-th column with the constraint that the sum be odd. The numbers i and j are the inputs of the parties.

Alice and Bob win the game if they place the same number in the intersection of the row and the column that they fill. The parties do not know i and j ahead of the game, and they cannot communicate after being given these values. They are allowed to communicate before the game begins, discuss game strategies, and send information to each other. It was shown in [BBT05] that there is no classical algorithm that lets Alice and Bob win the game with probability greater than 8/9, whereas there exists a quantum algorithm that lets them win the game with probability 1. This quantum algorithm is based on having each of the parties hold two qubits out of an entangled system of four qubits. The system of four qubits used in [Mer90] for that purpose is $$\Psi = \frac{1}{2}0011 - \frac{1}{2}0110 - \frac{1}{2}1001 + \frac{1}{2}1100.$$

Entanglement in the System $\Psi$

The system $\Psi$ is a superposition of four of the elements of the computational basis of $\mathbb{H}^{\otimes 4}$. Measuring that system in reference to the computational basis of $\mathbb{H}^{\otimes 4}$ we get one of the elements of that basis that appear in $\Psi$, each with probability ¼. Measuring any single qubit from the system $\Psi$ in reference to the computational basis of $\mathbb{H}$, each of the outcomes zero and one is obtained with probability ½. Nevertheless, the result of such a measurement will affect the possible outcomes of measurements of other qubits of that system. Specifically, assume that the first qubit of the system $\Psi$ was measured (in reference to the computational basis of $\mathbb{H}$) and that the outcome b was obtained. Then, measuring the third qubit of that system (in reference to the computational basis of $\mathbb{H}$) we get the outcome 1-b with probability 1. The same holds for measurements of the second and fourth qubits. Such a system of qubits, on which a measurement of some of the qubits affects the possible outcomes of measurements of other qubits, is an entangled system. Entanglement is the core element behind the quantum algorithm that wins the magic square game (and also behind many other breakthrough quantum algorithms).

Following is a brief description of the main stages of the winning algorithm as introduced in [Mer90]. Before the game begins, the parties generate a system of four entangled qubits (such as $\Psi$) and share it in such a way that Alice holds the first two qubits of the system and Bob holds the other two. The game begins, and the participants are given their inputs. Then, each party applies one of several predetermined quantum gates to his/her qubits according to the input. (Explicit matrix representation of these gates may be found in [BBT05].) Next, the parties measure their qubits (in reference to the computational basis of $\mathbb{H}$) and fill in the first two entries of their row/column according to the outcomes of their measurements. Each of them fills the last entry of her/his row/column according to the parity condition defined above. It was proved in [Mer90] that, by following this algorithm, Alice and Bob are guaranteed to win the game.

Figure 4:
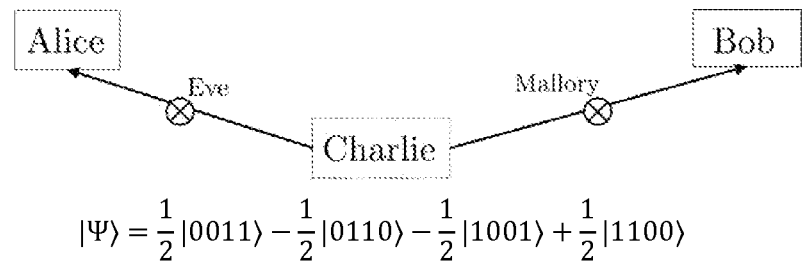
FIG. 4 schematically illustrates an adversarial attack by two adversaries.

It can be seen that entanglement plays a significant role in the magic square game wining algorithm. Now, assume that Alice and Bob are two distant parties, willing to participate in the game. To use the algorithm described above, they must share an entangled four-qubit state. Being far apart, they may ask a third party, Charlie, to generate such a four-qubit entangled state and transmit two qubits to each of them. In that case, two concerns may arise. First, Charlie might be untrustworthy. Second, two adversaries, Eve and Mallory, might intercept Charlie's transmission and use the entangled qubits sent by Charlie for a game of their own, or any other purpose (see FIG. 4).

Figure 5:
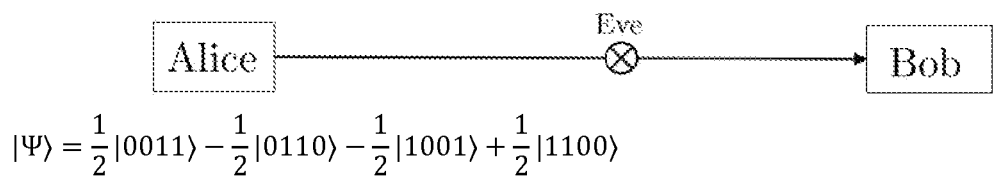
FIG. 5 schematically illustrates an adversarial attack by a single adversary.

To overcome the possibility that Charlie is untrustworthy, Alice and Bob may decide that one of them, say Alice, will generate the desired four-qubit entangled state and transmit two of the qubits to Bob. This does not solve the second concern. A single adversary, Eve, may intercept the transmission and use the qubits to engage in the Mermin-Peres magic square game with Alice instead of Bob (see FIG. 5).

We now show how two distant parties may securely generate and share a system of entangled qubits using our random basis encryption scheme. The constructions uses here, enabling securing this process against adversarial attacks, are similar to those used above where we construct the D gate. The stages are as follows.

Alice uses our random basis encryption scheme in order to generate independent encryptions of two 0 bits and two 1 bits. For ease of presentation, we denote that four-qubit system by $\psi_0\psi_0\psi_1\psi_1$. Each of the qubits is encrypted independently.

Figure 6:
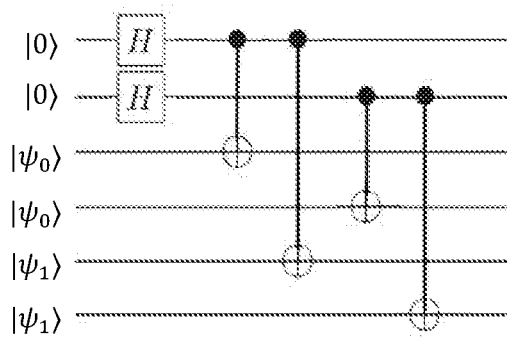
FIG. 6 shows a random basis entanglement gate.

Alice generates a pair of ancillary 0 qubits and applies the gate described in FIG. 6 to her system of six qubits.

The first two qubits are ancillary qubits, and are not used in the next stages of the scheme. Alice keeps the next two qubits to herself and transmits the last two to Bob.

Alice and Bob communicate through a secure communication channel (possibly, using our QKD scheme, presented below) and Alice shares with Bob the keys she used to generate the encrypted qubits in the first stage of this scheme.

Alice and Bob decrypt the qubits they hold and obtain a system of four entangled qubits.

Each of the qubits that Alice transmits to Bob in the third stage of this scheme is encrypted using a different key, and hence, if an adversary intercepts the transmission and possesses these qubits, then the adversary cannot use them to engage in the game in place of Bob. After decryption, the last four output qubits constitute a system of two pairs of maximally entangled qubits, which may be used to win the magic square game using the same methods as in [Mer90].

Observe that, an Hadamard gate is applied to the first and second qubits of the system. Then, each of these qubits is used as a control qubit in two CNOT gates, where the target qubits are the other four qubits. This procedure results in obtaining the same four qubit state as the one used in [Mer90].

Two applications of the proposed QHE scheme are illustrated below.

A Random Basis CNOT Quantum Key Distribution (QKD) Scheme

The random basis encryption scheme requires that the participants hold a shared key. Nevertheless, it may also be used to construct a two-stage (random basis) QKD scheme, in which one participant sends to another information in the form of a string of classical bits. That information may be a key, to be used in a symmetric key encryption scheme, or simply plain data. Suppose Alice holds a string of n classical bits $b=b_1 \ldots b_n \in \{0,1\}^n$, and wishes to send b privately to Bob. Alice and Bob may follow the scheme of sharing key by random base, as illustrated in FIG. 7.

The Two-stage Random Basis CNOT-QKD Scheme
1. Let $m \in \mathbb{N}$. Bob randomly picks $b'=b_1, \ldots b_{n+n}'$ from $\{0,1\}^{n+m}$.
2. For $1 \leq i \leq n+m$, Bob uses the random basis encryption scheme to generate an (independent) encryption $\psi_{b'_i}$ of $b'_i$, and transmits $\psi_{b'_i}$ to Alice.
3. Alice randomly picks m of the n+m qubits received from Bob. She calls Bob over a public channel, announces the positions of the m qubits she randomly chose, and Bob reveals the keys used for encrypting these qubits.
4. Alice decrypts the m qubits she chose, using the keys obtained at the previous stage, and announces the outcomes to Bob, which in turn, checks the correctness of the outcomes to detect possible adversarial eavesdropping attempts. If the error rate is small enough, they proceed to the next stage.
5. Alice now uses the n qubits that she did not measure at the previous stage, and for $1 \leq i \leq n$, if $b_i=1$ Alice applies a NOT gate to the i'th qubit; otherwise, she leaves it unchanged.
6. Alice sends the n qubits that were not measured by her back to Bob, who decrypts them and obtains a string, b".
7. Denote by $\tilde{b} \in \{0,1\}^n$ the n-bit string obtained from b' after omitting the m bits chosen by Alice at stage 3. Bob computes $b'' \otimes \tilde{b}$ to obtain b.

We now define the key-bit guessing game, which is the process of making the proposed QKD scheme IT-secure against eavesdropping attempts. The participants in this game are Alice, Bob, and Eve. It is assumed that the participants can generate qubits in the computational basis, apply quantum gates to the qubits, and measure qubits. Alice and Bob are connected via a noiseless quantum channel and an authenticated classical public channel. Eve has full access to the quantum channel and is constantly listening to the public channel. Eve is computationally unbounded.

The key-bit guessing game is defined as follows: The parties are given positive integer inputs, n, m. Alice and Bob engage in a QKD protocol of their choice to obtain a key of ≈n bits, while at most 2n+2m qubits can be transmitted between them. It is assumed that 2m qubits are used by Alice and Bob for eavesdropping test. In practice, after invoking a QKD protocol, Alice and Bob usually use error-correcting codes and cryptographic hash functions for performing data reconciliation and Privacy Amplification procedures. However, the necessity of these procedures depends on the maximal amount of information that may be obtained by an adversary. Reducing the amount of information accessible to an adversary increases the capacity of the channel and diminishes the need for error-correction and hash procedures. Hence, no (classical) error-correcting codes or hash functions are allowed in the proposed game. Having full access to the quantum channel, Eve decides on a strategy of her choice and may intercept qubits, measure them, replace them with other qubits of her choice, apply quantum gates to qubits, etc. At the last stage of the game, Alice and Bob decide if they want to abort the game. If they do, then no one wins. If not, then all parties simultaneously announce their output. Alice outputs her key, an n-bit string $k_A=\alpha_1 \ldots \alpha_n$, Bob outputs his key, $k_B=b_1 \ldots b_n$, and Eve outputs either ⊥ or a pair (e, i), where i is an integer and e is a bit. Eve wins the game if $\alpha_i=b_i=e$. This is equivalent to Eve correctly guessing a key bit.

The goal of Alice and Bob is to obtain a shared key. Therefore, it is required that $k_A=k_B$. However, since Eve has full control over the quantum channel, she may prevent Alice and Bob from ever obtaining a key (an exception is the case of Alice and Bob using the classical public channel to agree on a key using a classical KD scheme like RSA of Diffie-Helman, but the security of this key will not be information-theoretic. It is assumed that Eve is computationally unbounded and hence we focus on IT-secure key distribution schemes). Hence, it is not required that the outputs of Alice and Bob coincide.

We now consider the BB84 QKD scheme (but without the privacy amplification and data reconciliation phases). The scheme (called BB84 protocol) is described in detail in "Quantum cryptography: Public key distribution and coin tossing" (Bennett et al., IEEE New York, 1984), as illustrated in FIG. 8. Alice picks two uniformly random bits a and b and generates the qubit $H^a X^b 0$. Alice transmits the qubit to Bob, which picks a uniformly random bit c, applies a c-conditioned Hadamard and measures. Alice and Bob then announce a and c. If a and c are equal (which is expected with probability 0.5) then Bob measures the qubit in the computational basis, and the outcome of Bob's measurement is guaranteed to be b. Alice and Bob repeat the process for 2m+2n qubits, and then compare m outcomes of Bob's measurements (with a=c) with the corresponding b's to detect possible eavesdropping. In practice, Alice and Bob perform data reconciliation and privacy amplification processes. These processes are required since there is a possibility that Eve eavesdropped on the line and gained some information regarding the key. These processes reduce the bandwidth. It was very useful if there was a way of preventing an eavesdropper from gaining any information from the outset.

a WM-based strategy for Eve in the key-bit guessing game. As mentioned at the Introduction, weak measurements consist of two stages. First, we weakly interact the subject qubit with an ancillary qubit using a two-qubit gate. Then, we (strongly) measure the ancillary qubit. The outcome of the (strong) measurement of the ancillary qubit is the outcome of the weak measurement of the subject qubit. This process enables imprecisely measuring quantum states, outsmarting the uncertainty principle. We now demonstrate such a procedure. Let $\varepsilon>0$ and denote by $W_\varepsilon$ the following two-qubit quantum gate $$W_\varepsilon = \sqrt{\varepsilon} \cdot CNOT + \sqrt{1-\varepsilon} \cdot I \otimes I,$$

where I is the identity over a single qubit. One readily verifies that $W_\varepsilon$ is unitary. This unitary can be used by Eve to gain information regarding the qubit transmitted from Alice to Bob, leaving but slight indications for her presence. We begin with some intuition. It is known that qubits in the computational basis can be cloned using the CNOT gate and an ancillary 0 qubit. If the qubit designated for cloning is in the computational basis, then performing a CNOT with the ancillary qubit as the target qubit copies the control qubit to the target qubit without disturbing the control qubit. However, if the control qubit is not in the computational basis, the CNOT gate do disturb it (and it, of course, cannot be cloned, due to the no-cloning theorem). The $W_\varepsilon$ gate is a linear combination of the identity operation on two qubits and the CNOT gate. The smaller £ is, the closer $W_\varepsilon$ is to the identity operation. If a qubit $\psi$ is in one of the four states 0,1, + or −, we can apply $W_\varepsilon$ to $\psi$ and an ancillary 0 qubit and then measure the ancilla. This way, if $\psi$ is either 0 or 1 we can gain a small amount of information regarding $\psi$ without disturbing it, and if $\psi$ is either + or − then we (get no information but) only slightly disturb it. We define the following strategy for Eve for the key-bit guessing game where Alice and Bob use the BB84 protocol. Eve randomly picks $j \in \{1, \ldots, 2n+2m\}$, prepares an ancilla 0 qubit, applies $W_\varepsilon$ to the j'th qubit transmitted from Alice to Bob and the ancilla, and sends Alice's qubit to Bob. Eve measures the ancilla and obtains an outcome e (illustrated at FIG. 9).

Next, Eve is listening to the discussion of Alice and Bob over the public channel and finds whether Bob measured the j'th qubit in the right basis (i.e, if a=c). If not, Eve outputs ⊥. If a=c, then Eve keeps on listening to find whether the j'th qubit was used by Alice and Bob for eavesdrop-checking or not. If it was, then Eve outputs ⊥. If not, then the outcome of Bob's measurement on the j'th qubit is Bob's i'th key-bit, and Eve outputs (e, i). We assume that Alice and Bob abort only if they used the bit for eavesdropping-check and got different results. Hence, if Eve delivers an output (and not ⊥) then Alice and Bob do not abort.

We are only interested in the cases where Alice and Bob measured the j'th qubit in the same basis, i.e., a=c. Consider the system of two qubits where the first qubit is the qubit transmitted from Alice to Bob and the second qubit is the ancillary qubit used by Eve for the WM attack. If a=c=0, then that system of two qubits is in the state $$(1-b)(\sqrt{1-\varepsilon}+\sqrt{\varepsilon}\cdot i)00+b\cdot\sqrt{1-\varepsilon}\cdot 10+\sqrt{\varepsilon}\cdot i\cdot b\cdot 11,$$

and if a=c=1, then the system of two qubits is in the state $$\frac{\sqrt{1-\varepsilon}+i\cdot\sqrt{\varepsilon}}{\sqrt{2}}00+(-1)^b\sqrt{\frac{1-\varepsilon}{2}}10+(-1)^b\cdot i\cdot\sqrt{\frac{\varepsilon}{2}}11.$$

We use the probabilities of the different possible outcomes of measurements of Bob and Eve given by these states to compute the total success probability of Eve given that a=c (see FIG. 10). We conclude that if Bob measured Alice's qubit in the right basis (i.e., a=c) then The pairs (x, y) in the bottom of the probabilities tree indicate the outcomes of the measurements of Bob (x) and Eve (y). The numbers in the green rectangles indicate the probabilities of the cases in which Eve correctly guessed the key-bit without causing an erroneous outcome for Bob. This happens with probability $$\frac{1}{2}+\frac{\varepsilon}{8}.$$

The numbers in the red ovals indicate the probabilities of the cases in which Eve's attack resulted in Bob measuring an erroneous result. This happens with probability $$\frac{\varepsilon}{4},$$

and in these cases, if Alice and Bob use this bit for eavesdropping-check then they will detect Eve's presence and abort. The purple hexagons indicate the probabilities of the cases in which Bob gets the right result and Eve fails in guessing the key bit. In these cases, if Alice and Bob use this bit for eavesdropping check they will not detect Eve's presence. We conclude that, using the WM-attack described above via the $W_\varepsilon$ gate, Eve can gain an $$\frac{\varepsilon}{8}$$

advantage in guessing a key-bit while reducing the risk of getting caught. The fact that our random basis QKD scheme can encode both 0 and 1 as the same qubit makes our scheme resilient against such WM-attacks.

The proposed QKD protocol has several advantages over Kak's scheme. The first advantage is that the proposed QKD protocol requires only two stages of communication, while Kak's protocol requires three stages of communication, which requires extra 50% communication overhead. Also, in Kak's protocol, each of the parties must have the capability of applying arbitrary quantum gates to quantum states. In the other hand, the proposed QKD protocol requires that only one party will possess this capability, while it is sufficient for the other party to be able to apply only NOT gates to qubits. Furthermore, in Kak's scheme, both parties should agree on an encoding of the bits before the execution of the scheme. In the proposed QKD protocol no such requirement is necessary.

Weak Measurements and Comparison with Other Schemes

An adversary may attempt to gain information regarding the encrypted data following the framework of the weak measurement model, suggested by Aharonov et al. [LXY18]]. Weak measurements enable accumulating information regarding the state of the qubit while not collapsing the state, but only biasing it a little. Weak measurements consist of two stages. First, we weakly interact the subject qubit with an ancillary qubit using a two-qubit gate. Then, we (strongly) measure the ancillary qubit. The outcome of the (strong) measurement of the ancillary qubit is the outcome of the weak measurement of the subject qubit. This process enables imprecisely measuring quantum states, outsmarting the uncertainty principle. Our scheme, based on adding extra randomness to the encryption process, has safer security implications against weak measurements.

Bennett and Brassard [BB84] presented the first QKD scheme. In their scheme, Alice sends Bob random bits encoded as qubits in either the computational basis {0,1} or the diagonal basis {+,−}. The bit 0 is always encoded by either 0 or +, and the bit 1 is always encoded by either 1 or −. An adversary may intercept the qubits sent from Alice to Bob, perform weak measurements over them and accumulate some information regarding their state, and send them to Alice as if they were never intercepted. Such an attack may give the adversary a non-negligible advantage at a reduced risk of being caught. The same hindrance of using a different set of qubits to encode each classical bit repeats itself in many other QKD schemes, and hence, similar attacks can be applied there too. In our QKD scheme, 0 and 1 bits may have the same encoding, and hence, weak measurement attacks give the adversary no advantage. As shown in the security proof of our scheme (Appendix B), even if the adversary is given all the entries of the density matrix representing the encrypted state, it leaks no information regarding the plaintext. Namely, for every $\rho=|Enc|_{(\theta,\varphi)}(0)$, there exist valid $\theta',\varphi'$ such that $\rho=|Enc|_{(\theta',\varphi')}(1)$. Furthermore, our scheme may be used to transmit not only a random key but any binary message. Hence, our scheme provides a method for Alice and Bob to communicate securely using two rounds of interaction via an authenticated quantum channel.

Kak presented in [Kak06] a protocol which suggests a method for Alice and Bob to communicate securely using three rounds of interaction via an authenticated quantum channel. In Kak's scheme, before the protocol executes, two orthogonal states are set as the encodings of the bits. Then, Alice applies a random rotation A to the encoding of her message b and sends it to Bob. In turn, Bob applies a random rotation B to the bit and sends it back to Alice, which now rotates the qubit in the opposite direction by applying $A^\dagger$ to it. Alice now sends the qubit back to Bob, which applies $B^\dagger$ to it and obtains the encoding of Alice's bit. While Kak's scheme requires three round of interaction, our scheme requires only two rounds. Furthermore, in Kak's scheme, Alice and Bob should agree on an encoding of the bits before the execution of the scheme. In our scheme, no such requirement is presented.

Deng and Long suggested in [DL04] a method for secure communication between Alice and Bob. Similarly to [BB84], their scheme use qubits only in the computational or diagonal basis, and hence their scheme is vulnerable to weak measurement attacks.

Coalitions-resilient Secure Multi-party XOR Computation

In the following scenario, each of N honest-but-curious participants, $\mathcal{P}_i$, $1 \leq i \leq N$, is holding a bit $b_i \in \{0,1\}$. The participants are interested in learning the XOR of their bits, $b_1 \otimes \ldots \otimes b_N$, without revealing their own bits. One trivial solution to that problem is as follows (see FIG. 11).

One of the participants, say $\mathcal{P}_1$, picks $b'_0 \in \{0,1\}$ uniformly at random.

For $1 \leq i \leq N$: $\mathcal{P}_i$ computes $b'_{i-1} \otimes b_i$ and sends the result to the next participant.

$\mathcal{P}_1$ computes $b'_N \otimes b'_0$ ($=b_1 \otimes \ldots \otimes b_N$), and sends the result to the other participants.

This solution is vulnerable to attacks of coalitions of honest-but-curious participants, trying to gain information regarding the bits of other participants. E.g., $\mathcal{P}_{k-1}$ and $\mathcal{P}_{k+1}$ can learn $\mathcal{P}_k$'s bit by computing $b'_{k-1} \otimes b'_k$. More generally, $\mathcal{P}_m$ and $\mathcal{P}_{m+l}$ can learn the XOR of the bits of the participants $\mathcal{P}_{m+1}, \ldots, \mathcal{P}_{m+l-1}$.

One application of our random basis encryption scheme is the following solution to the multi-party XOR computation problem, which is resilient to such attacks of coalitions of honest-but-curious participants. The scheme is illustrated in FIG. 12, and its stages are as follows:

$\mathcal{P}_1$ picks $b \in \{0,1\}$ uniformly at random and uses the random basis encryption scheme to generate an encryption $\psi_b$ of b.

For $1 \leq i \leq N$:

If $b_i = 1$, then $\mathcal{P}_i$ applies a NOT gate to the received qubit.

$\mathcal{P}_i$ transmits the qubit to the next participant.

$\mathcal{P}_1$ decrypts the received qubit to obtain an outcome b'. Computing $b \otimes b'$, she obtains the desired XOR of the bits of all the participants and sends the result to them.

At each stage, the qubit received by a participant $\mathcal{P}_i$ is an encryption of a random bit. Since our encryption scheme is IT-secure, measuring that encryption-qubit, $\mathcal{P}_i$ obtains zero and one with equal probabilities, regardless of the actual value of the encrypted bit. Hence, using our IT-secure random basis encryption scheme, coalitions of honest-but-curious participants cannot gain any information regarding the bits of the other participants. In fact, allowing the participants in that coalition to perform measurements is a slight deviation from the definition of being honest-but-curious. Honest-but-curious participants cannot deviate from the protocol, but only attempt to gain further information from the data that they receive during the execution of the protocol. As mentioned above, our scheme remains IT-secure even if we allow that deviation.

In the event that a certain $\mathcal{P}_i$ does deviate from the protocol, and performs a measurement of the qubit, it may yield an erroneous result. Repeated executions of the protocol will reveal that with high probability: If no measurements are performed, the same result will be obtained in all the executions. If measurements are performed, they will produce a random sequence of results that will most probably not be constant.

As various embodiments have been described and illustrated, it should be understood that variations will be apparent to one skilled in the art without departing from the principles herein. Accordingly, the invention is not to be limited to the specific embodiments described and illustrated in the drawings.

REFERENCES

[BBT03] Gilles Brassard, Anne Broadbent, and Alain Tapp. Multi-party pseudo-telepathy. In *Workshop on Algorithms and Data Structures*, pages 1-11. Springer, 2003.

[BBT05] Gilles Brassard, Anne Broadbent, and Alain Tapp. Quantum pseudo-telepathy. *Foundations of Physics*, 35(11):1877-1907, 2005.

[BD18] Dor Bitan and Shlomi Dolev. One-round secure multiparty computation of arithmetic streams and functions (extended abstract). In *International Symposium on Cyber Security Cryptography and Machine Learning*, pages 255-273. Springer, 2018.

[DJ92] David Deutsch and Richard Jozsa. Rapid solution of problems by quantum computation. *Proc. R. Soc. Lond. A*, 439(1907):553-558, 1992.

[DSS16] Yfke Dulek, Christian Schaffner, and Florian Speelman. Quantum homomorphic encryption for polynomial-sized circuits. In *Annual Cryptology Conference, pages* 3-32. Springer, 2016.

[EPR35] Albert Einstein, Boris Podolsky, and Nathan Rosen. Can quantum-mechanical description of physical reality be considered complete? *Physical review*, 47(10): 777, 1935.

[Gen09] Craig Gentry. *A fully homomorphic encryption scheme*. Stanford University, 2009.

[Gro96] Lov K Grover. A fast quantum mechanical algorithm for database search. In *Proceedings of the twenty-* eighth annual ACM symposium on Theory of computing, pages 212-219. ACM, 1996.

[Jor18] Stephen Jordan. Quantum algorithm zoo, 2018. http://math.nist.gov/quantum/zoo.

[Lia13] Min Liang. Symmetric quantum fully homomorphic encryption with perfect security. *Quantum information processing,* 12(12):3675-3687, 2013.

[LK14] Yehuda Lindell and Jonathan Katz. *Introduction to modern cryptography.* Chapman and Hall/CRC, 2014.

[LXY18] Hong-Wei Li, Zheng-Mao Xu, and Zhen-Qiang Yin. Monitoring the intercept-resend attack with the weak measurement model. *Quantum Information Processing,* 17(10):257, 2018.

[Mer90] N David Mermin. Simple unified form for the major no-hidden-variables theorems. *Physical Review Letters,* 65(27):3373, 1990.

[NC02] Michael A Nielsen and Isaac Chuang. Quantum computation and quantum information, 2002.

[OTF18] Yingkai Ouyang, Si-Hui Tan, and Joseph F Fitzsimons. Quantum homomorphic encryption from quantum codes. *Physical Review A,* 98(4):042334, 2018.

[Sho94] Peter W Shor. Algorithms for quantum computation: Discrete logarithms and factoring. In *Foundations of Computer Science,* 1994 *Proceedings., 35th Annual Symposium* on, pages 124-134. Ieee, 1994.

[TKO+16] Si-Hui Tan, Joshua A Kettlewell, Yingkai Ouyang, Lin Chen, and Joseph F Fitzsimons. A quantum approach to homomorphic encryption. *Scientific reports,* 6:33467, 2016.

[YPDF14] Li Yu, Carlos A Pérez-Delgado, and Joseph F Fitzsimons. Limitations on information-theoretically-secure quantum homomorphic encryption. Physical Review A, 90(5):050303, 2014.

[AAUC18] Abbas Acar, Hidayet Aksu, A Selcuk Uluagac, and Mauro Conti. A survey on homomorphic encryption schemes: Theory and implementation. ACM Computing Surveys (CSUR), 51(4):79, 2018.

[ABC+19] Dorit Aharonov, Zvika Brakerski, Kai-Min Chung, Ayal Green, Ching-Yi Lai, and Or Sattath. On quantum advantage in information theoretic single-server pir. In Yuval Ishai and Vincent Rijmen, editors, Advances in Cryptology—EUROCRYPT 2019, pages 219-246, Cham, 2019. Springer International Publishing.

[ABL64] Yakir Aharonov, Peter G. Bergmann, and Joel L. Lebowitz. Time symmetry in the quantum process of measurement. Phys. Rev., 134:B1410B1416, June 1964.

[ABP+02] Yakir Aharonov, Alonso Botero, Sandu Popescu, Benni Reznik, and Jeff Tollaksen. Revisiting hardy's paradox: counterfactual statements, real measurements, entanglement and weak values. Physics Letters A, 301(3-4):130-138, 2002.

[ADSS17] Gorjan Alagic, Yfke Dulek, Christian Schaffner, and Florian Speelman. Quantum fully homomorphic encryption with verification. In Advances in Cryptology—ASIACRYPT 2017—Proceedings of the 23rd International Conference on the Theory and Applications of Cryptology and Information Security, Part I, pages 438-467, 2017.

[AMTdW00] Andris Ambainis, Michele Mosca, Alain Tapp, and Ronald de Wolf. Private quantum channels. In 41st Annual Symposium on Foundations of Computer Science, FOCS 2000, pages 547-553, 2000.

[BB84] Charles H Bennett and Gilles Brassard. Quantum cryptography: Public key distribution and coin tossing. IEEE New York, 1984.

[BBT03] Gilles Brassard, Anne Broadbent, and Alain Tapp. Multi-party pseudo-telepathy. In Workshop on Algorithms and Data Structures, pages 1-11. Springer, 2003.

[BBT05] Gilles Brassard, Anne Broadbent, and Alain Tapp. Quantum pseudo-telepathy. Foundations of Physics, 35(11):1877-1907, 2005.

[BJ15] Anne Broadbent and Stacey Jeffery. Quantum homomorphic encryption for circuits of low t-gate complexity. In Proceedings of Advances in Cryptology—CRYPTO 2015—35th Annual Cryptology Conference, Part II, pages 609-629, 2015.

[BP12] Samuel L Braunstein and Stefano Pirandola. Side-channel-free quantum key distribution. Physical review letters, 108(13):130502, 2012.

[BP16] Zvika Brakerski and Renen Perlman. Lattice-based fully dynamic multi-key fhe with short ciphertexts. In Annual Cryptology Conference, pages 190-213. Springer, 2016.

[Bra18] Zvika Brakerski. Quantum FHE (almost) as secure as classical. In Advances in Cryptology—CRYPTO 2018—Proceedings of the 38th Annual International Cryptology Conference, Part III, pages 67-95, 2018.

[Bro15] Anne Broadbent. Delegating private quantum computations. Canadian Journal of Physics, 93(9):941-946, 2015.

[CDN15] Ronald Cramer, Ivan Bjerre Damgård, and Jesper Buus Nielsen. Secure multiparty computation. Cambridge University Press, 2015.

[Chi05] Andrew M. Childs. Secure assisted quantum computation. Quantum Information & Computation, 5(6): 456-466, 2005.

[DJ92] David Deutsch and Richard Jozsa. Rapid solution of problems by quantum computation. Proc. R. Soc. Lond. A, 439(1907):553-558, 1992.

[DL04] Fu-Guo Deng and Gui Lu Long. Secure direct communication with a quantum one-time pad. Physical Review A, 69(5):052319, 2004.

[DSS16] Yfke Dulek, Christian Schaffner, and Florian Speelman. Quantum homomorphic encryption for polynomialsized circuits. In Advances in Cryptology—CRYPTO 2016—Proceedings of the 36th Annual International Cryptology Conference, Part III, pages 3-32, 2016.

[EC11] Avshalom C Elitzur and Eliahu Cohen. The retrocausal nature of quantum measurement revealed by partial and weak measurements. In AIP Conference Proceedings, volume 1408, pages 120-131. AIP, 2011.

[ED01] Avshalom C. Elitzur and Shahar Dolev. Nonlocal effects of partial measurements and quantum erasure. Phys. Rev. A, 63:062109, May 2001.

[EPR35] Albert Einstein, Boris Podolsky, and Nathan Rosen. Can quantum-mechanical description of physical reality be considered complete? Physical review, 47(10): 777, 1935.

[GDL+10] G G Gillett, R B Dalton, B P Lanyon, M P Almeida, Marco Barbieri, Geoff J Pryde, J L OâA˘

The invention claimed is:

1. A computer implemented method for distributing a quantum key for performing information-theoretically secure quantum gate computation, comprising:
   a) generating, by at least one processor, a quantum key $k=(\theta, \varphi)$ by uniformly selecting a random pair $(\theta, \varphi)$ from $$[0, 2\pi] \times \left\{\frac{\pi}{2}, -\frac{\pi}{2}\right\};$$

b) setting, by said at least one processor, an element $$\psi_0 = \cos\left(\frac{\theta}{2}\right) + e^{i\varphi}\sin(\theta/2),$$

as an encryption of "0" using the quantum key $k=(\theta, \varphi)$ as the encryption key;
   c) setting, by said at least one processor, an element $\psi_1=\sin(\theta/2)-e^{i\varphi}\cos(\theta/2)$ to be the encryption of "1" using said key, such that $\psi_0$ and $\psi_1$ are orthogonal;
   d) constituting, by said at least one processor, a random orthonormal basis $B_{(\theta,\varphi)}$; and
   e) allowing $\psi_0$ to be equal to $NOT\psi_1$ and vice versa by applying a NOT operator executed by a NOT gate to $\psi_1$ and selecting $\varphi=\pm\pi/2$, such that said random orthonormal basis is $$B_{(\theta, \pm\frac{\pi}{2})} = \left\{\cos\left(\frac{\theta}{2}\right) \pm i\sin\left(\frac{\theta}{2}\right), \sin\left(\frac{\theta}{2}\right) \mp i\cos\left(\frac{\theta}{2}\right)\right\};$$

f) transmitting, by a transceiver coupled to said at least one processor, the generated quantum key.

2. A method according to claim 1, further comprising using elements $\psi_0$ and $\psi_1$ or bit-wise encryption of a string x of classical bits.

3. A method according to claim 1, wherein encryption operation on an input message $b \in M$, where $\mathcal{M}$ is a message space, is done using the key $k=(\theta, \varphi)$, by:
   a) generating qubit $|b\rangle$ ;
   b) applying K to $|b\rangle$ to obtain $|c\rangle = K|b\rangle$ , where $$K = \begin{pmatrix} \cos(\theta/2) & \sin(\theta/2) \\ e^{i\varphi}\sin(\theta/2) & -e^{i\varphi}\cos(\theta/2) \end{pmatrix} \in M_2(\mathbb{C}); \text{ and}$$

c) outputting an encrypted message $|c\rangle$ .

4. A method according to claim 1, wherein decryption operation on input ciphertext $|\psi\rangle$ is done using the quantum key $k=(\theta, \varphi)$, by:
   a) applying $K^\dagger$ being a conjugate transpose of $$K = \begin{pmatrix} \cos(\theta/2) & \sin(\theta/2) \\ e^{i\varphi}\sin(\theta/2) & -e^{i\varphi}\cos(\theta/2) \end{pmatrix} \in M_2(\mathbb{C})$$

to $|\psi\rangle$ , to obtain $K^\dagger|\psi\rangle$ ;
   b) measuring $K^\dagger|\psi\rangle$ with reference to a computational basis $$B_{(\theta, \pm\frac{\pi}{2})} = \{\cos(\theta/2) \pm i\sin(\theta/2), \sin(\theta/2) \mp i\cos(\theta/2)\};$$

and
   c) outputting a measurement result.

5. A method according to claim 1, further comprising performing IT-secure quantum gate computations over encrypted data comprising at least one of the encryption of "0" or the encryption of "1".

6. A method according to claim 5, wherein the quantum gate is selected from the group of:
   NOT gates;
   a quantum gate, using an ancillary |0> qubit, that takes elements of the orthonormal basis to equally weighted superpositions of said elements;
   controlled-NOT (CNOT) and $C^n$NOT gates, where control qubits are set as plaintext qubits.

7. A method according to claim 1, wherein any gate that commutes with a family of unitary matrices K, defined in |Enc|, is applied homomorphically to encrypted data comprising at least one of the encryption of "0" or the encryption of "1".

8. A computer being capable of distributing a quantum key for performing information-theoretically secure quantum gate computation, comprising at least one processor and a transceiver coupled to said at least one processor, adapted to:
   a) generate a quantum key $k=(\theta,\varphi)$ by selecting a uniformly random pair $(\theta, \varphi)$ from $$[0, 2\pi] \times \left\{\frac{\pi}{2}, -\frac{\pi}{2}\right\};$$

b) set an element $$\psi_0 = \cos\left(\frac{\theta}{2}\right) + e^{i\varphi}\sin(\theta/2),$$

an encryption of "0" using the quantum key $k=(\theta,\varphi)$ as the encryption key;
   c) set an element $\psi_1=\sin(\theta/2)-e^{i\varphi}\cos(\theta/2)$ to be the encryption of "1" using said key, such that $\psi_0$ and $\psi_1$ are orthogonal;
   d) constitute a random orthonormal basis $B_{(\theta,\varphi)}$;
   e) select $\varphi=\pm\pi/2$, such that said random orthonormal basis is $$B_{(\theta, \pm\frac{\pi}{2})} = \{\cos(\theta/2) \pm i\sin(\theta/2), \sin(\theta/2) \mp i\cos(\theta/2)\};$$

f) set $\psi_0$ to be equal to $NOT\psi_1$ and vice versa by applying a NOT operator executed by a NOT gate to $\psi_1$; and
   g) transmit the generated quantum key by said transceiver.

9. A computer according to claim 8, further adapted to perform IT-secure quantum gate computations over encrypted data comprising at least one of the encryption of "0" or the encryption of "1".

10. A computer according to claim 8, wherein the quantum gate is selected from the group of:

NOT gates;

a quantum gate, using an ancillary $|0\rangle$ qubit, that takes elements of the orthonormal basis to equally weighted superpositions of said elements;

controlled-NOT (CNOT) and $C^n$NOT gates, where control qubits are set as plaintext qubits.

11. A method according to claim 1, wherein both "0" and "1" are encoded as the same qubit.

* * * * *